(12) United States Patent
Morikawa et al.

(10) Patent No.: US 12,345,179 B2
(45) Date of Patent: Jul. 1, 2025

(54) TURBINE STATOR VANE AND GAS TURBINE

(71) Applicant: MITSUBISHI HEAVY INDUSTRIES, LTD., Tokyo (JP)

(72) Inventors: Tomoko Morikawa, Yokohama (JP); Satoshi Hada, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/567,254

(22) PCT Filed: Jun. 23, 2022

(86) PCT No.: PCT/JP2022/025110
§ 371 (c)(1),
(2) Date: Dec. 5, 2023

(87) PCT Pub. No.: WO2023/282078
PCT Pub. Date: Jan. 12, 2023

(65) Prior Publication Data
US 2024/0263561 A1    Aug. 8, 2024

(30) Foreign Application Priority Data
Jul. 7, 2021   (JP) ................................ 2021-112476

(51) Int. Cl.
*F01D 9/04* (2006.01)
*F01D 25/12* (2006.01)
*F02C 7/12* (2006.01)

(52) U.S. Cl.
CPC ............ *F01D 9/041* (2013.01); *F01D 25/12* (2013.01); *F02C 7/12* (2013.01); *F05D 2240/12* (2013.01); *F05D 2260/20* (2013.01)

(58) Field of Classification Search
CPC ....... F01D 9/041; F01D 25/12; F05D 2240/81
See application file for complete search history.

(56) References Cited

U.S. PATENT DOCUMENTS 4,946,346 A * 8/1990 Ito ........................... F01D 5/189
415/115
6,471,480 B1 * 10/2002 Balkcum, III .......... F01D 5/186
415/115

(Continued)

FOREIGN PATENT DOCUMENTS

JP      2008-95697 A    4/2008
JP    2011-185270 A    9/2011
JP        6312929 B2    4/2018

OTHER PUBLICATIONS

International Search Report dated Sep. 6, 2022, issued in counterpart International Application No. PCT/JP2022/025110. (2 pages).

*Primary Examiner* — Brian P Wolcott
*Assistant Examiner* — John S Hunter, Jr.
(74) *Attorney, Agent, or Firm* — WHDA, LLP

(57) ABSTRACT

A turbine stator vane comprising: a vane body; a shroud formed at an end of the vane body in a vane height direction; a fillet portion joining the vane body and the shroud; and a plurality of cooling holes in a bottom plate contacting a combustion gas flow path. The plurality of cooling holes connect to entry openings and downstream exit openings formed in the bottom plate. The entry openings and the exit openings are connected by cooling hole center lines having the same inclination with respect to an axial direction. The plurality of cooling holes constitute a set of cooling hole rows in which a linear first opening center line connecting the centers of the exit openings and a linear second opening center line connecting the centers of the entry openings are formed parallel to each other.

16 Claims, 9 Drawing Sheets

(56) References Cited

U.S. PATENT DOCUMENTS

| | | | |
|---|---|---|---|
| 8,205,458 B2 * | 6/2012 | Lee | F01D 9/041 |
| | | | 415/115 |
| 9,874,102 B2 * | 1/2018 | Azad | F01D 5/18 |
| 2011/0217159 A1 | 9/2011 | McMahan et al. | |
| 2012/0177479 A1 | 7/2012 | Azad et al. | |

\* cited by examiner

FIG. 4
A-A
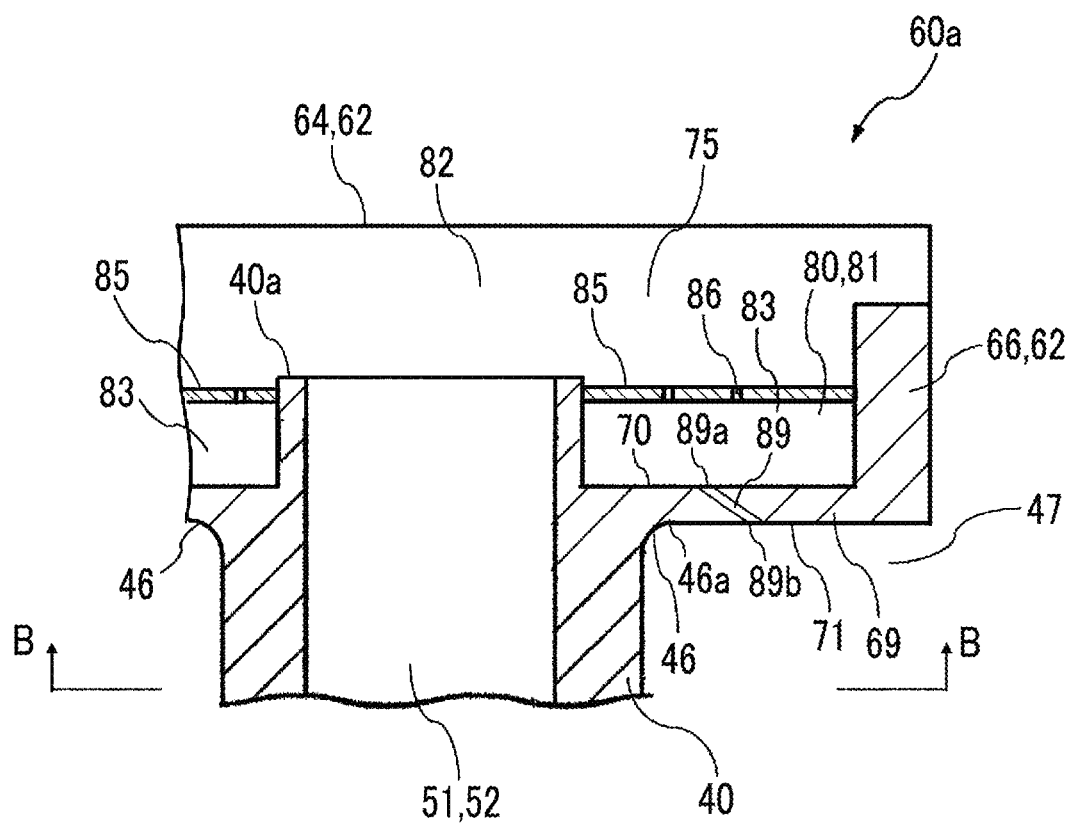
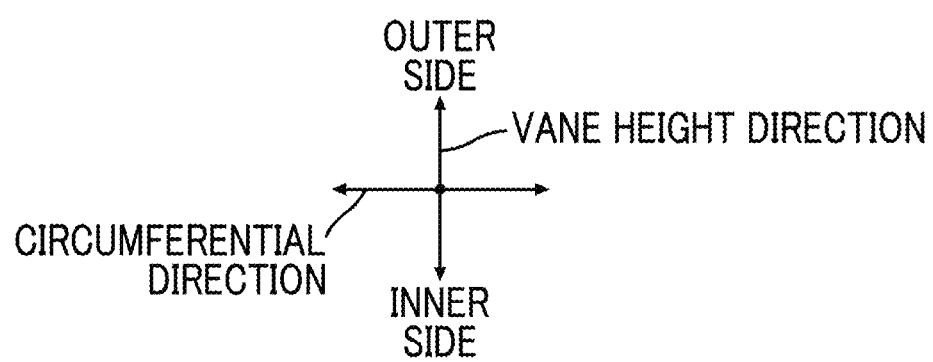

FIG. 8
DETAILS OF C PORTION
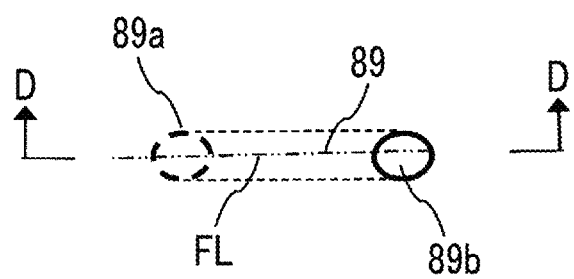
D-D CROSS SECTION
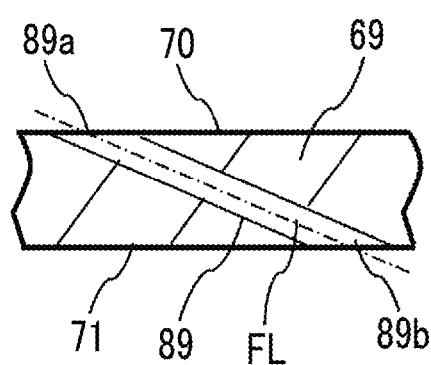

TURBINE STATOR VANE AND GAS TURBINE

TECHNICAL FIELD

The present disclosure relates to a turbine stator vane and a gas turbine.

The present application claims priority based on Japanese Patent Application No. 2021-112476 filed in Japan on Jul. 7, 2021, the contents of which are incorporated herein by reference.

BACKGROUND ART

The gas turbine co-fires compressed air and fuel to generate a high-temperature combustion gas. The turbine stator vane forming a part of the gas turbine is disposed in the generated high-temperature combustion gas. Thus, there is a possibility of thermal damage from the high-temperature combustion gas. In order to prevent the thermal damage, the turbine stator vane receives a part of compressed air from the outside as cooling air to cool the vane body and the shroud. PTL 1 discloses an example of a cooling structure using the cooling air for the turbine stator vane. PTL 1 discloses an example in which cooling holes required for each of a high temperature region and a low temperature region of a vane body and a shroud are provided to provide appropriate cooling.

CITATION LIST

Patent Literature

[PTL 1] Japanese Unexamined Patent Publication No. 2011-185270

SUMMARY OF INVENTION

Technical Problem

However, it is desired to reduce an amount of cooling air by a more appropriate cooling means than the cooling structure disclosed in PTL 1.

An object of the present disclosure is to provide a turbine stator vane capable of further reducing the amount of cooling air by applying a more appropriate cooling means to a negative pressure side leading edge region of the shroud having a particularly high thermal load among shrouds of the turbine stator vane.

Solution to Problem

According to at least one embodiment of the present disclosure, there is provided a turbine stator vane including: a vane body; a shroud that is formed at an end portion of the vane body in a vane height direction; and a fillet portion that joins the vane body and the shroud. The shroud includes a bottom plate which is in contact with a combustion gas passage, a peripheral wall which extends in the vane height direction along a peripheral edge of the bottom plate, and a recessed portion which forms a space surrounded by the peripheral wall and the bottom plate. The peripheral wall includes a leading edge end portion which extends to a leading edge side of the vane body, and a negative pressure surface side end portion which extends from a leading edge of the vane body on a negative pressure surface side to a trailing edge of the vane body. The shroud has a plurality of cooling holes which are formed in a negative pressure surface side leading edge region of the shroud and formed in the bottom plate.

The plurality of cooling holes each have a first end which is connected to an inlet opening formed in the bottom plate.

The plurality of cooling holes each have a second end which is connected to an outlet opening formed in a gas path surface of the bottom plate and formed on a more axially downstream side than the inlet opening. The plurality of cooling holes are disposed at predetermined distances from a vane surface of the vane body toward the leading edge end portion or the negative pressure surface side end portion in a circumferential direction. An inclination of a cooling hole center line connecting the inlet opening and the outlet opening with respect to an axial direction is kept the same. The plurality of cooling holes form a group of cooling hole rows in which a first opening center line having a shape of a straight line connecting centers of the outlet openings and a second opening center line having a shape of a straight line connecting centers of the inlet openings are formed parallel to each other. A plurality of the cooling hole rows are disposed along the vane surface from an axially upstream side toward the axially downstream side. The inclination of the cooling hole center line of the cooling holes of the plurality of cooling hole rows is smaller toward the axially downstream side.

Advantageous Effects of Invention

According to the at least one embodiment of the present disclosure, an appropriate cooling structure is formed in the negative pressure surface side leading edge region of the shroud, and the gas path surface of the bottom plate is uniformly cooled. Further, the amount of cooling air is reduced, and the efficiency of the gas turbine is improved.

BRIEF DESCRIPTION OF DRAWINGS

FIG. 4 is a cross-sectional view of the shroud taken along the line A-A of FIG. 3.

FIG. 8 is a plan view and a cross-sectional view of a cooling hole showing details of a C portion of FIG. 5.

DESCRIPTION OF EMBODIMENTS

Hereinafter, embodiments of the present disclosure will be described with reference to the accompanying drawings.
<<Configuration of Gas Turbine>>
A configuration of a gas turbine to which a turbine stator vane is applied will be described with reference to FIG. 1. It should be noted that FIG. 1 is a schematic configuration diagram showing a gas turbine 1 of the embodiment to which the turbine stator vane 24 is applied.

Figure 1:
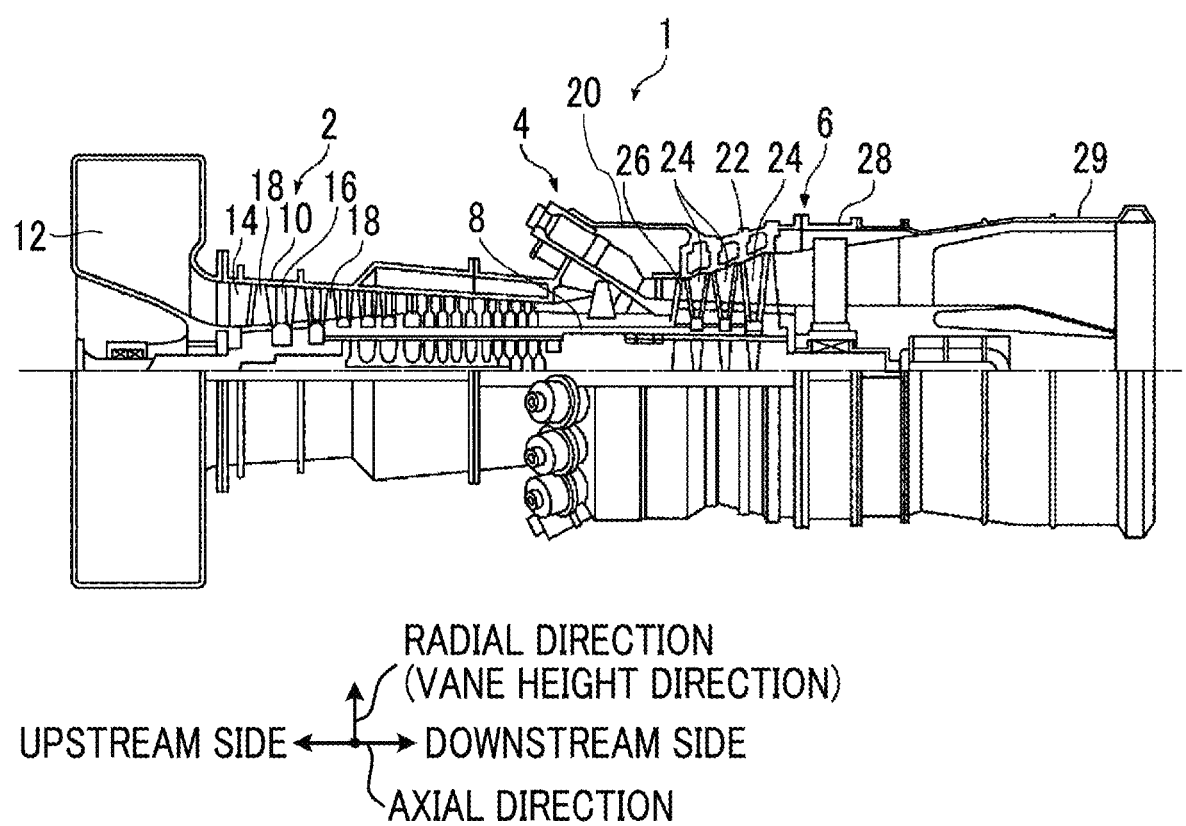
FIG. 1 is a configuration diagram of a gas turbine according to an embodiment of the present disclosure.

As shown in FIG. 1, the gas turbine 1 according to an embodiment includes a compressor 2 for generating compressed air, a combustor 4 for generating combustion gas G by using compressed air and fuel, and a turbine 6 which is rotationally driven by the combustion gas G. In a case of the gas turbine 1 for power generation, a generator (not shown in the drawing) is connected to the turbine 6, and power generation is performed by rotational energy of the turbine 6.

Each configuration of the gas turbine 1 will be described with reference to FIG. 1.

The compressor 2 includes a compressor casing 10, an intake chamber 12 that is provided on the inlet side of the compressor casing 10 in order to take in air, a rotor 8 that is provided so as to penetrate both the compressor casing 10, and a turbine casing 22 to be described later, and various vanes that are disposed in the compressor casing 10. Various vanes include inlet guide vanes 14 that are provided on an intake chamber 12 side, a plurality of compressor stator vanes 16 that are fixed to a compressor casing 10 side, and a plurality of compressor rotor vanes 18 that are planted in the rotor 8 so as to be alternately arranged in the axial direction with respect to the compressor stator vanes 16. The compressor 2 may include other constituent elements such as a bleed air chamber (not shown in the drawing). Such a compressor 2 causes the air taken in from the intake chamber 12 to pass through the plurality of compressor stator vanes 16 and the plurality of compressor rotor vanes 18 and compresses the air to generate compressed air. The compressed air is sent from the compressor 2 to the combustor 4 on the axially downstream side.

The combustor 4 is disposed inside a casing 20. As shown in FIG. 1, a plurality of combustors 4 are disposed in an annular shape around the rotor 8 in the casing 20. The combustor 4 is supplied with the fuel and compressed air generated by the compressor 2, and combusts the fuel to generate a high-temperature and high-pressure combustion gas G which is a working fluid of the turbine 6. The generated combustion gas G is sent from the combustor 4 to the turbine 6 on the axially downstream side.

The turbine 6 includes the turbine casing 22 and the various turbine vanes disposed in the turbine casing 22. Various turbine vanes include a plurality of turbine stator vanes 24 fixed to the turbine casing 22 side, and a plurality of turbine rotor vanes 26 planted in the rotor 8 so as to be alternately arranged in the axial direction with respect to the turbine stator vanes 24.

In the turbine 6, the rotor 8 extends in the axial direction, and the combustion gas G discharged from the turbine casing 22 is discharged to an exhaust casing 28 on the downstream side in the axial direction. In FIG. 1, the left side shown in the drawing is the axially upstream side, and the right side shown in the drawing is the axially downstream side. Further, in the following description, in a case where simply a radial direction is written, the radial direction represents a direction orthogonal to the rotor 8. Further, in a case where a circumferential direction is written, the rotation direction of the rotor 8 is represented. The radial direction may be referred to as a vane height direction.

The turbine rotor vane 24 is configured to generate a rotational driving force from the high-temperature and high-pressure combustion gas G flowing in the turbine casing 22 together with the turbine stator vane 24. This rotational driving force is transmitted to the rotor 8 to drive a generator (not shown in the drawing) connected to the rotor 8.

An exhaust chamber 29 is connected to the turbine casing 22 on the axially downstream side through the exhaust casing 28. The combustion gas G after driving of the turbine 6 is discharged to the outside through the exhaust casing 28 and the exhaust chamber 29.

<<Configuration of Turbine Stator Vane>>

Figure 2:
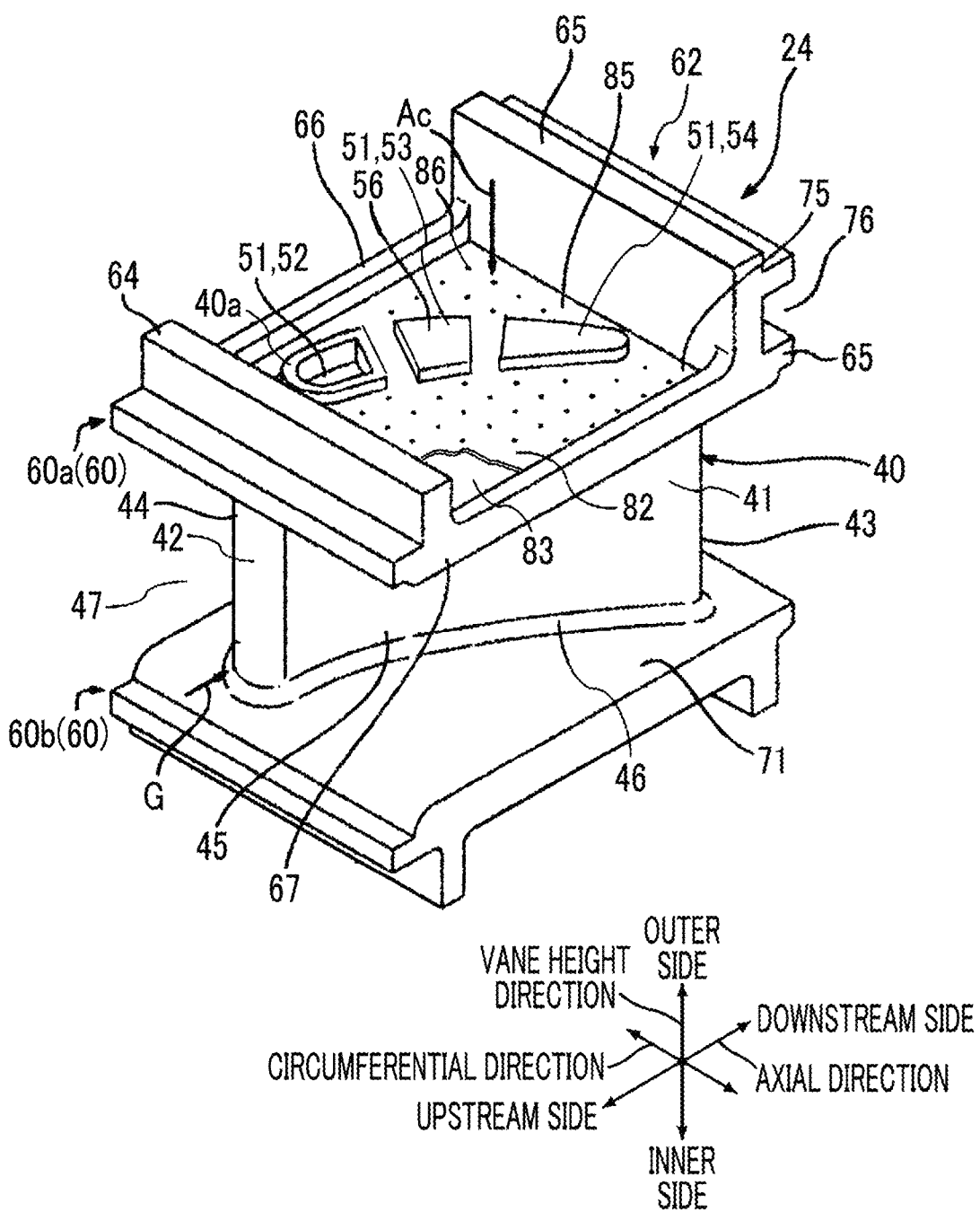
FIG. 2 is a perspective view of a gas turbine stator vane according to the embodiment of the present disclosure.

FIG. 2 shows a perspective view of the turbine stator vane 24. As shown in FIG. 2, the stator vane 24 of the turbine 6 has a vane body 40 extending in the vane height direction and shrouds 60 at both ends of the vane body 40 on the outer side and the inner side in the vane height direction. The shrouds 60 include an outer side shroud 60a formed outside the vane body 40 in the vane height direction and an inner side shroud 60b formed inside the vane body 40 in the vane height direction. The vane body 40 is disposed in the combustion gas passage 47 through which the combustion gas G flows. The outer side shroud 60a defines a position on the outer side in the vane height direction of the combustion gas passage 47 formed in an annular shape around the rotor 8. The inner side shroud 60b defines a position on the inner side of the annular combustion gas passage 47 in the vane height direction.

A hook 76 for supporting the turbine stator vane 24 to the turbine casing 22 is provided on a trailing edge 43 side of the vane body 40 in the outer side shroud 60a of the stator vane 40. The hook 76 of the turbine stator vane 24 is provided on the peripheral wall 62 on the trailing edge 43 side of the outer side shroud 60a.

As shown in FIG. 2, the vane body 40 extends in the vane height direction, is connected to the outer side shroud 60a through a fillet portion 46 on the outer side in the vane height direction, and is connected to the inner side shroud 60b through a fillet portion 46 on the inner side in the vane height direction. The vane body 40 is integrated with the outer side shroud 60a and the inner side shroud 60b to form the turbine stator vane 24.

Figure 3:
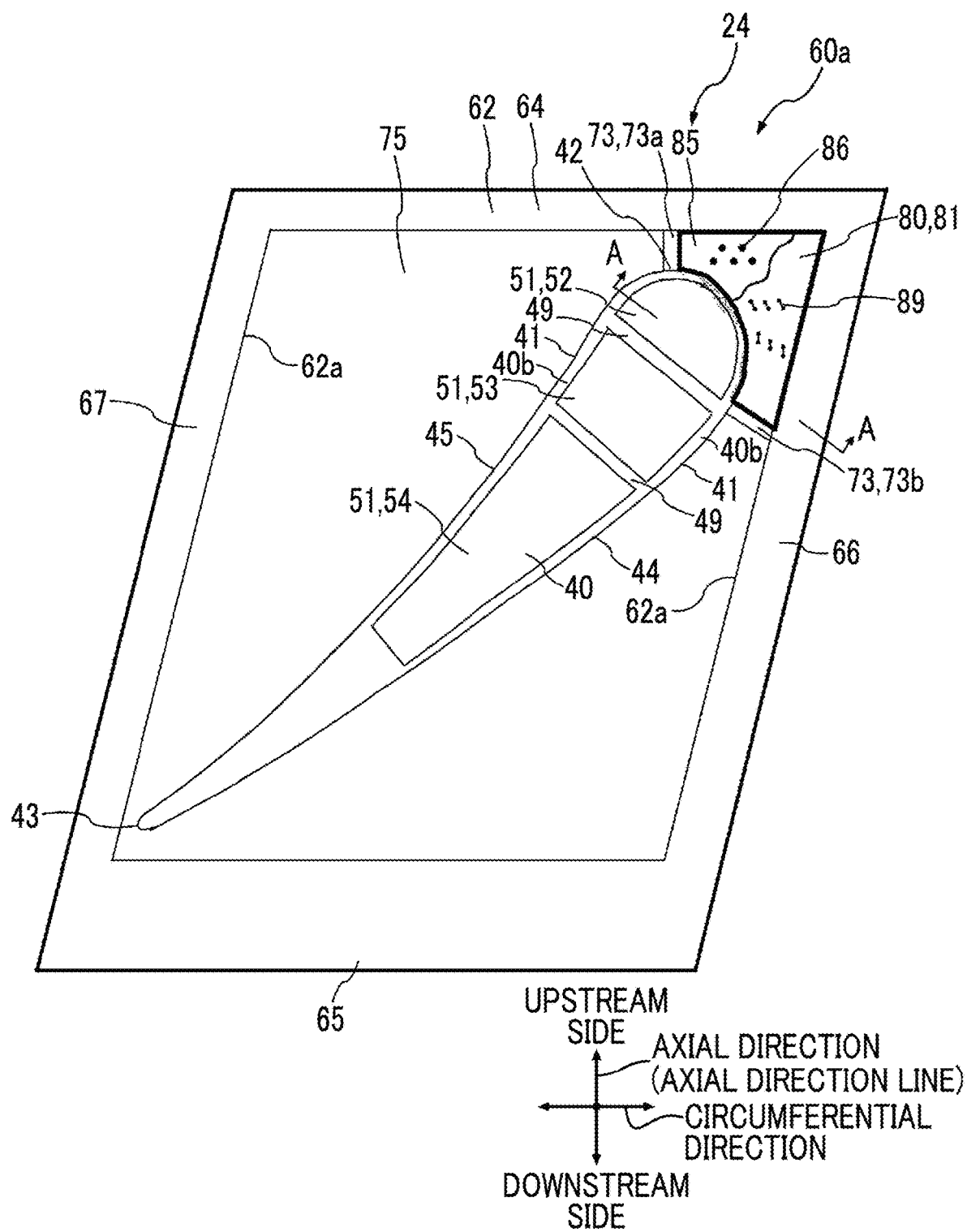
FIG. 3 is a plan view of a shroud of an embodiment according to the present disclosure.

FIG. 3 shows a plane section of the outer side shroud 60a as viewed from an outer side in the vane height direction on the counterflow-path side with respect to the combustion gas passage 47. In the following description, the outer side shroud 60a side will be described as an example. As shown in FIGS. 2 and 3, the vane body 40 connected to the outer side shroud 60a through the fillet portion 46 forms a vane shape. The vane body 40 has a leading edge 42 at an axially upstream end and a trailing edge 43 at an axially downstream end. The vane body 40 has a negative pressure surface 44 forming a convex shape and a positive pressure surface 45 forming a concave shape among surfaces facing the circumferential direction of a vane surface 41. The negative pressure surface 44 and the positive pressure surface 45 are cemented to each other at the leading edge 42 and the trailing edge 43, and integrally form one vane body 40. In addition, in the following description, the positive pressure surface 45 side of the vane body 40 in the circumferential direction may be referred to as a ventral side, and the negative pressure surface 44 side of the vane body 40 may be referred to as a back side.

The vane body 40 includes a vane body cavity 51 (first cavity) which extends in the vane height direction and in which cooling air Ac flows through an internal space of the vane body 40. The vane body cavity 51 extends in the vane height direction from the outer side shroud 60a to the inner side shroud 60b, and a plurality of internal spaces are successively formed in a range from the leading edge 42 to the trailing edge 43. The embodiments shown in FIGS. 2 and 3 show, as an example, an example in which three vane body cavities 51 (a vane body leading edge cavity 52, a vane body intermediate cavity 53, and a vane body trailing edge cavity 54) connecting the leading edge 42 and the trailing edge 43 of the vane body 40 in the leading-edge-to-trailing-edge direction are disposed.

The vane body cavities 51 are partitioned into the plurality of internal spaces by a plurality of vane body partition ribs 49 of which one end is connected to the inner wall 62a of the vane wall 40b on the negative pressure surface 44 side and of which the other end is connected to the inner wall 62a of the vane wall 40b on the positive pressure surface 45 side. The vane body cavities 51 are partitioned into the vane body leading edge cavity 52, which is disposed on the leading edge 42 side of the vane body 40, and the vane body intermediate cavity 53, which is disposed adjacent to the axially downstream side of the vane body leading edge cavity 52, through a vane body partition rib 49, on the leading edge 42 side of the vane body 40. Further, similarly, the vane body cavity 51 is partitioned into the vane body intermediate cavity 53 and the vane body trailing edge cavity 54, which is disposed adjacent to the axially downstream side of the vane body intermediate cavity 53, through the vane body partition rib 49, on the trailing edge 43 side of the vane body 40.

Each of the vane body cavities 51 does not communicate with each other, and is opened to either of the shrouds 60 of the outer side shroud 60a or the inner side shroud 60b, and the vane body end portion 40a of the other vane body cavity 51 is blocked by providing a lid 56 or the like. In all the vane body cavities 51, the cooling air Ac is supplied from either the outer side shroud 60a or the inner side shroud 60b to cool the vane body 40 and is discharged from the vane surface 41 to the combustion gas passage 47. In addition, the vane body cavities 51 communicate with each other to form a serpentine passage, and the cooling air Ac is supplied from one opening 56a of the vane body leading edge cavity 52 in the vane height direction, flows through the vane body intermediate cavity 53 and the vane body trailing edge cavity 54, and is discharged to the combustion gas passage 47 from a cooling passage (not shown in the drawing) formed in the trailing edge 43.

FIG. 4 shows a cross section of the vane body leading edge cavity 52 and the outer side shroud 60a around the vane body leading edge cavity 52 of the vane body 40 taken along the line A-A of FIG. 3. As shown in FIGS. 2, 3, and 4, the outer side shroud 60a is constituted by a bottom plate 69 that forms a bottom surface of the outer side shroud 60a, a peripheral wall 62 that is formed on the entire periphery of the outer peripheral edge of the bottom plate 69 and stands upright in the vane height direction from the inner surface 70 of the bottom plate 69, a partition rib 73 that divides the recessed portion 75 formed by the bottom plate 69 and the peripheral wall 62 into a plurality of cavities 80, and a collision plate 85 that partitions the cavity 80 (recessed portion 75) into an outer side cavity 82 (third cavity) on the outer side in the vane height direction, an inner side cavity 83 (fourth cavity) on the inner side in the vane height direction.

The collision plate 85, which is disposed in the cavity 80, has a plurality of through-holes 86 that communicate the outer side cavity 82 and the inner side cavity 83. The outer side cavity 82 constitutes a part of the recessed portion 75, and the outer side shroud 60a forms one space. On the other hand, in the inner side cavity 83, the recessed portion 75 is partitioned into a plurality of spaces in the vane height direction by the collision plate 85, and is disposed inside the outer side cavity 82 in the vane height direction with the collision plate 85 interposed therebetween.

The peripheral wall 62 is constituted by a leading edge end portion 64 that is formed on the leading edge 42 side on the axially upstream side, a trailing edge end portion 65 that is disposed to face the leading edge end portion 64 on the axially downstream side and extends in the circumferential direction on the trailing edge 43 side, a negative pressure surface side end portion 66 that is formed at the end portion of the negative pressure surface 44 side of the vane body 40 in the circumferential direction, and a positive pressure surface side end portion 67 that is disposed to face the negative pressure surface side end portion 66 in the circumferential direction and is formed on the end portion on the positive pressure surface 45 side of the vane body 40.

The bottom plate 69 has an outer surface (gas path surface) 71 that is in contact with the combustion gas G inside the combustion gas passage 47 in the vane height direction, and an inner surface (counterflow-path surface) 70 that faces the outer side in the vane height direction on a counterflow-path side opposite to an outer surface (gas path surface) 71 in the vane height direction. The bottom plate 69 has a plurality of cooling holes 89 to be described in detail later. Each cooling hole 89 penetrates the bottom plate 69 in the vane height direction and communicates with the combustion gas passage 47 facing the inner side cavity 83 and the outer surface 71 through the cooling hole 89. The end portion of the vane body 40 on the outer side in the vane height direction (on the inner side in the vane height direction in a case of the inner side shroud 60b) has a vane body end portion 40a that slightly protrudes to the outer side or the inner side in the vane height direction from the inner surface 70 of the bottom plate 69 of the outer side shroud 60a.

As shown in FIG. 3, a region of the outer side shroud 60a on the leading edge 42 side on the negative pressure surface 44 side has a plurality of partition ribs 73 each of which a cross section has a protrusion shape protruding to the counterflow-path side opposite to the outer surface (gas path surface) 71 from the inner surface 70 of the bottom plate 69. In the present embodiment, the partition rib 73 includes a leading edge partition rib 73a that connects the leading edge end portion 64 and the vane body end portion 40a on the leading edge 42 side of the vane body 40 formed in the recessed portion 75 of the shroud 60, and a negative pressure surface side intermediate partition rib 73b that connects the vane body end portion 40a of the vane body 40 and the negative pressure surface side end portion 66. The leading edge partition rib 73a and the negative pressure surface side intermediate partition rib 73b is disposed in a region on the leading edge 42 side on the negative pressure surface 44 side of the outer side shroud 60a. Thereby, the inner side cavity 83 is formed, which constitutes a part of the negative pressure surface side leading edge cavity 81 (second cavity) as a space surrounded by the vane body end portion 40a, the leading edge end portion 64, the negative pressure surface side end portion 67, the leading edge partition rib 73a, and the negative pressure surface side intermediate partition rib 73b. Accordingly, the inner side cavity 83 communicates with the outer side cavity 82 through the through-hole 86 of the collision plate 85 on the outer side in the vane height direction, and communicates with the combustion gas passage 47 through the cooling holes 89 of the bottom plate 69 on the inner side in the vane height direction.

A configuration of the inner side shroud 60b is approximately the same as the configuration of the outer side shroud 60a described above. That is, the structures shown in FIGS. 3 and 4 are examples of the outer side shroud 60a, but the structures shown in FIGS. 3 and 4 can also be applied to the configuration of the inner side shroud 60b. Accordingly, regarding the name and the symbol of each configuration of the inner side shroud 60b, unless otherwise specified, the description of each configuration of the outer side shroud 60a may be used as it is. Also in the following description using FIGS. 4 to 8, unless otherwise specified, the description relating to the outer side shroud 60a is also applicable to the inner side shroud 60b. In a case of the inner side shroud 60b, the outer side of the outer side shroud 60a in the vane height direction is changed as the inner side thereof in the vane height direction, and the inner side thereof in the vane height direction is changed as the outer side thereof in the vane height direction.

In general, in a region of the turbine stator vane 24 which forms the combustion gas passage 47 interposed between shrouds 60 at both ends in a vane height direction, the high-temperature combustion gas G flowing into the turbine stator vane 24 from the axially upstream side flows along the vane surface 41 and the gas path surface 71, and the gas path surface 71 of the shroud 60 is overheated. In particular, the gas path surface 71 on the negative pressure surface 44 side on the leading edge 42 side has a remarkable tendency to overheat since the flow velocity of the combustion gas G is faster than that on the positive pressure surface 45 side. Accordingly, the cooling means for suppressing thermal damage of the shroud 60 from the combustion gas G is required. In the following description, some embodiments of the cooling structure of the negative pressure surface side leading edge cavity 81 of the shroud 60 of the turbine stator vane 24 will be described. In the description of the following embodiments, the shroud 60 including the outer side shroud 60a and the inner side shroud 60b will be described. Accordingly, unless otherwise specified, the shroud 60 is applicable to both the outer side shroud 60a and the inner side shroud 60b.

First Embodiment

Figure 5:
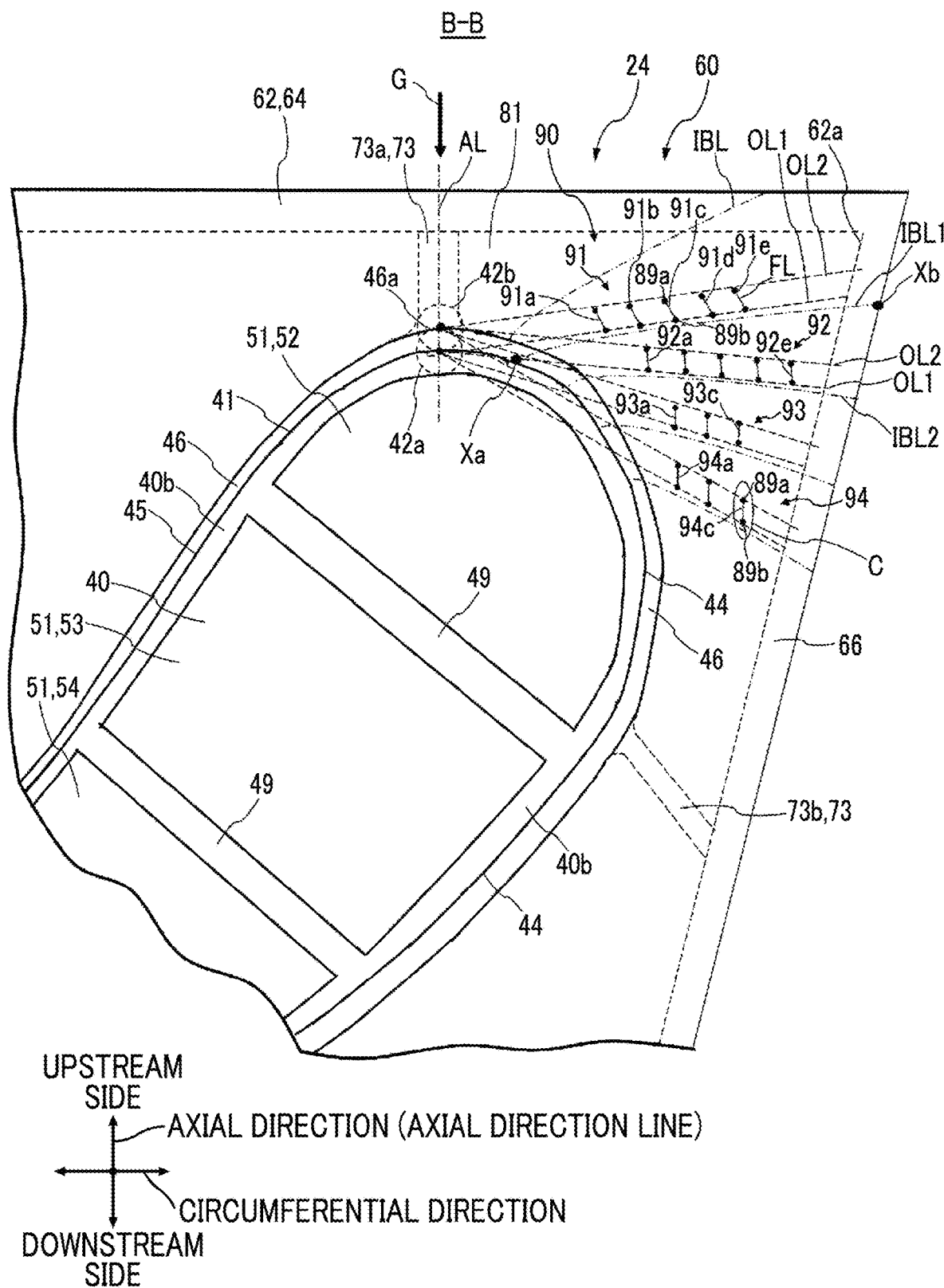
FIG. 5 shows a plane section of a gas path surface of the shroud along the line B-B of FIG. 4.
Figure 6:
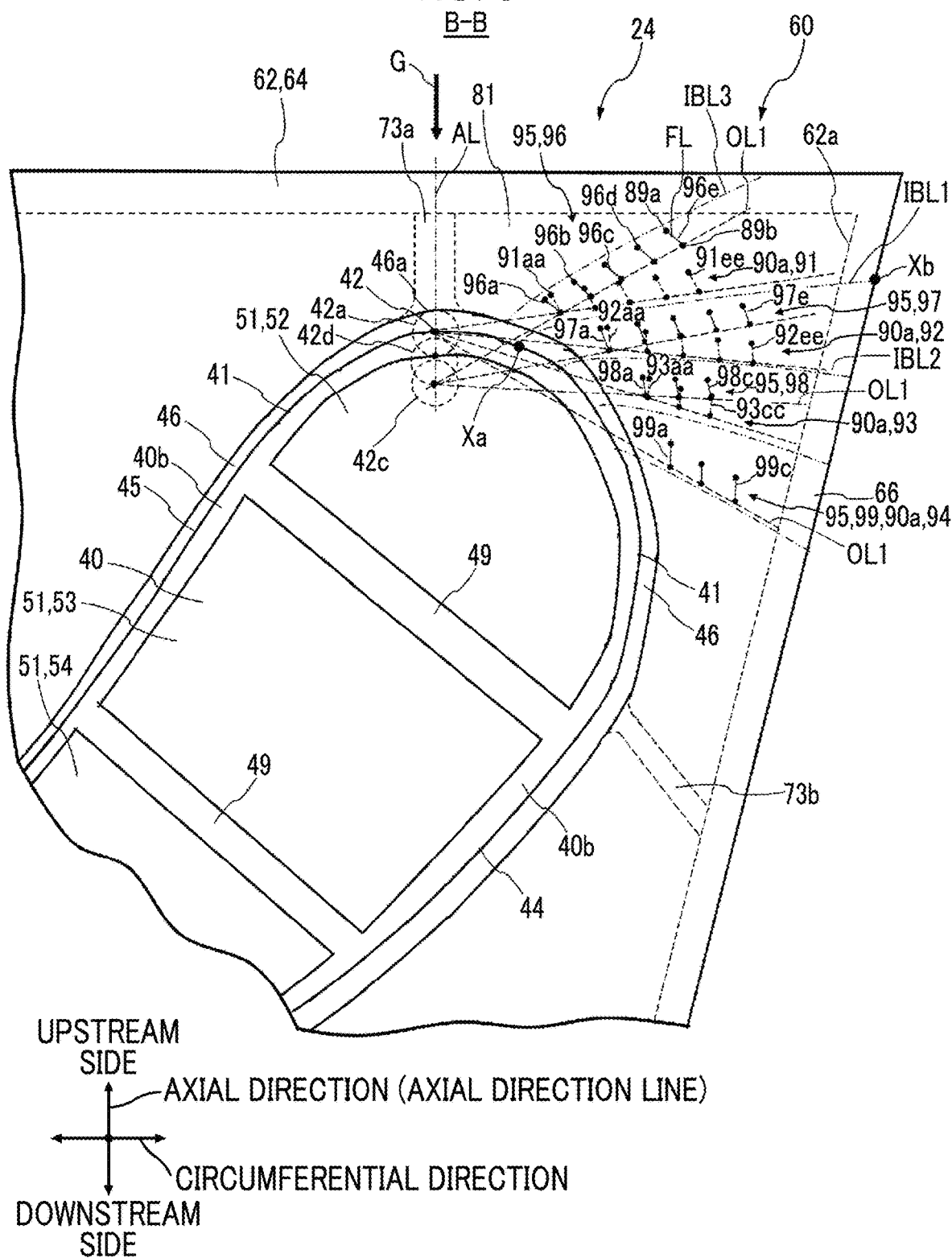
FIG. 6 shows a plane section of another embodiment of a gas path surface of the shroud along the line B-B of FIG. 4.
Figure 7:
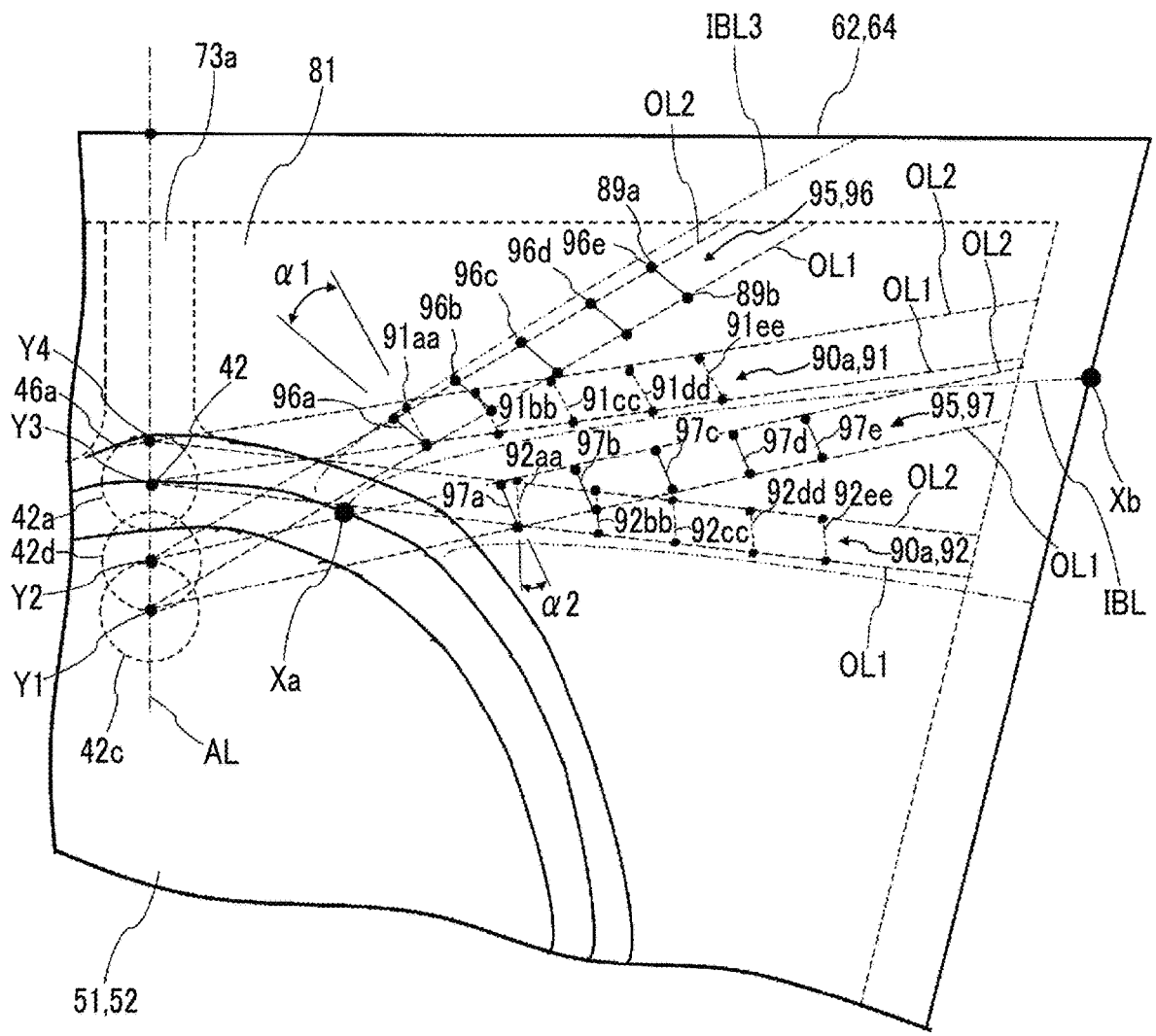
FIG. 7 is a detailed view showing a part of the plane section of the gas path surface of the shroud shown in FIG. 6.

FIGS. 3, 4, and 5 show the cooling structure of rotation of the negative pressure surface side leading edge cavity 81 of the shroud 60 in the present embodiment. In addition, FIGS. 5, 6, and 7 show a plane section of the outer side shroud 60a on the leading edge 42 side on the negative pressure surface 44 side as viewed from an inner gas path surface (outer surface) 71 side in the vane height direction, and are cross-sectional views taken along the line B-B of FIG. 4.

The cooling structure of the present embodiment is constituted by the collision plate 85 having the plurality of through-holes 86, the bottom plate 69 having the plurality of cooling holes 89, the outer side cavity 82 formed outside the collision plate 85 in the vane height direction, and the inner side cavity 83 formed inside the collision plate 85 in the vane height direction. With combination of such configurations, in the shroud 60, a cooling structure, in which an impingement cooling structure and a film cooling structure are combined, is formed. In the impingement cooling structure, the cooling air Ac supplied from the outer side cavity 82 through the through-hole 86 formed in the collision plate 85 is ejected to the inner side cavity 83, and collides with the inner surface 70 of the bottom plate 69, thereby performing impingement cooling (collision cooling) on the inner surface 70. In the film cooling structure, the outer surface (gas path surface) 71 of the bottom plate 69 is cooled in a process in which the cooling air Ac after impingement cooling is discharged to the combustion gas passage 47 through the cooling holes 89 formed in the bottom plate 69.

The cooling structure, in which impingement cooling and film cooling of the negative pressure surface side leading edge cavity 81 are combined, will be specifically described below with reference to FIGS. 3, 4, 5, and 9.

On the outer surface (gas path surface) 71 of the negative pressure surface side leading edge cavity 81 of the shroud 60, the plurality of cooling holes 89 are disposed along the vane surface 41 of the vane body 40 so as to surround the vane surface 41. In the negative pressure surface side leading edge cavity 81 of the shroud 60, a plurality of cooling hole rows 90 having a plurality of cooling holes 89 are disposed along the change of the curved surface of the vane surface 41 at predetermined distances so as to surround the outer periphery of the vane surface 41 on the negative pressure surface 44 side of the vane body cavity 51 of the vane body 40. The plurality of cooling hole rows 90 are formed such that an inclination thereof with respect to the axial direction gradually changes more toward the axially downstream side.

The cooling hole rows 90 (91, 92, 93, and 94) shown in FIG. 5 are constituted by the first cooling hole row 91, the second cooling hole row 92, and the third cooling hole row 93, and a fourth cooling hole row 94, in order from the axially upstream side to the axially downstream side. Each of the cooling hole rows 91, 92, 93, and 94 has a plurality of cooling holes 89. In addition, regarding the reference numerals of the cooling holes 89 constituting the third cooling hole row 93 and the fourth cooling hole row 94 among the plurality of cooling holes 89 constituting each of the cooling hole rows 91, 92, 93, and 94, the reference numerals are noted only on the cooling hole 89 closest to the vane surface 41 and the cooling hole 89 farthest from the vane surface 41, and the reference numerals of the other cooling holes 89 are not shown.

Each of the cooling hole rows 91, 92, 93, and 94 is constituted by the plurality of cooling holes 89 disposed with a predetermined distance kept, from the vane surface 41 side of the vane body 40 toward the leading edge end portion 64 or the negative pressure surface side end portion 66, with reference to the cooling hole 89 disposed at the position closest to the vane surface 41. Here, in a case where a straight line connecting a center of an inlet opening 89a and a center of an outlet opening 89b of the cooling hole 89 is set as the cooling hole center line FL, a direction, in which the cooling hole 89 extends, coincides with a direction in which the cooling hole center line FL extends. As described above, the combustion gas G flowing into the gas path surface 71 on the leading edge 42 side of the turbine stator vane 24 from the axially upstream side flows to the negative pressure surface 44 side and the positive pressure surface 45 side along the vane surface 41 of the vane body 40. The vane surface 41 on the negative pressure surface 44 side of the vane body 40 forms a curved surface having a convex shape, and the shape of the vane surface 41 changes more toward the axially downstream side. Accordingly, the flow direction of the combustion gas G flowing along the vane surface 41 changes as the curved surface of the vane surface 41 of the vane body 40 changes. On the other hand, it is desirable that the cooling air Ac discharged from the cooling holes 89 of the bottom plate 69 of the shroud 60 to the combustion gas passage 47 is discharged in a direction along the flow of the combustion gas G of which the flow direction changes so as not to disturb the flow of the combustion gas G. Accordingly, the plurality of cooling holes 89 forming the plurality of cooling hole rows 90 are disposed such that the inclination thereof with respect to the axial direction gradually changes more toward the axially downstream side, in accordance with the change in the flow direction of the combustion gas G. That is, the inclination of the cooling hole center line FL with respect to the axial direction line AL of the plurality of cooling holes 89 forming the plurality of cooling hole rows 90 gradually is smaller toward the axially downstream side.

Here, the configuration of the cooling hole row 90 (91, 92, 93, 94) will be described with reference to FIG. 5. As described above, it is desirable that each of the cooling hole rows 91, 92, 93, and 94 shown in FIG. 5 is configured such that the plurality of cooling holes 89 constituting the same cooling hole row 90 extend in a direction, in which the cooling holes 89 are separated from the vane surface 41, from the position of the cooling hole 89 closest to the vane surface 41 toward the leading edge end portion 64 or the negative pressure surface side end portion 66, with reference to the position of the cooling hole 89 closest to the vane surface 41, with the distance thereof and the inclination thereof with respect to the axial direction line AL kept the same. Further, it is desirable that a direction in which the group of each of the cooling hole rows 91, 92, 93, and 94 extends is set to be parallel to a direction in which the equal pressure line IBL of the combustion gas G to be described later extends.

As shown in FIG. 5, the cooling hole center line FL of the above-mentioned cooling hole 89 is indicated by the solid line having a straight line shape connecting the center of the inlet opening 89*a* and the center of the outlet opening 89*b* of the plurality f cooling holes 89 constituting each of the cooling hole rows 91, 92, 93, and 94 forming the cooling hole row 90. The plurality of cooling holes 89 forming each of the cooling hole rows 91, 92, 93, and 94 have a first opening center line OL1 having a straight line shape indicated by the broken line connecting the centers of outlet openings 89*b* of cooling holes 89 adjacent to each other in a direction toward the leading edge end portion 64 or the negative pressure surface side end portion 66 from the positions of the plurality of cooling holes 89 close to the vane surface 41 on which the cooling hole rows 91, 92, 93, and 94 are disposed. Further, similarly, the plurality of cooling holes 89 forming the same cooling hole row 90 have a linear second opening center line OL2 indicated by the broken line connecting the centers of inlet openings 89*a* of cooling holes 89 adjacent to each other in a direction toward the leading edge end portion 64 or the negative pressure surface side end portion 66 from the positions of the plurality of cooling holes 89 close to the vane surface 41 on which the cooling hole rows 91, 92, 93, and 94 are disposed. The first opening center line OL1 and the second opening center line OL2 are collectively referred to as an opening center line OL.

FIG. 8 shows a structure of the cooling holes 89 as details of the C portion of the cooling holes shown in FIG. 5. As shown in detail of the C portion in FIG. 8, the cooling holes 89 formed in the bottom plate 69 each have the inlet opening 89*a* opening to the inner surface 70 and the outlet opening 89*b* opening to the outer surface (gas path surface) 71. The outlet opening 89*b* is formed at a position on the trailing edge 43 side on the more axially downstream side than the position of the inlet opening 89*a*. The inclinations of the cooling holes 89 with respect to the inner surface 70 or the outer surface (gas path surface) 71 of the bottom plate 69 are the same, and the lengths of the cooling hole center lines FL, which correspond to the lengths of the cooling holes 89 each connecting the inlet opening 89*a* and the outlet opening 89*b* of the cooling hole 89, are also the same.

Here, in a case where the cooling hole row 90 in the present embodiment is defined, the cooling hole row 90 extends in a direction, in which the cooling hole row 90 is separated from the vane surface 41, from the position of the cooling hole 89 closest to the vane surface 41 toward the leading edge end portion 64 or the negative pressure surface side end portion 66, with reference to the position of the cooling hole 89 closest to the vane surface 41. Each of the cooling hole rows 91, 92, 93, and 94 formed of the plurality of cooling holes 89 can be regarded as one group of the plurality of cooling holes 89 extending with the distances and the inclinations thereof with respect to the axial direction line AL kept the same. Furthermore, the cooling hole center lines FL of the plurality of cooling holes 89 constituting the same cooling hole rows 91, 92, 93, and 94 are arranged parallel to each other with the distances thereof and the inclinations thereof with respect to the axial direction line AL kept the same in the same cooling hole rows 91, 92, 93, and 94. Further, the first opening center line OL1 and the second opening center line OL2 of the plurality of cooling holes 89 forming the same cooling hole rows 91, 92, 93, and 94 are formed parallel to each other, and extend with the same inclination thereof with respect to the cooling hole center line FL. It is desirable that the inclination of the cooling hole center line FL with respect to the first opening center line OL1 is kept the same in the same cooling hole rows 91, 92, 93, and 94 at any position in the axial direction.

As shown in FIG. 5, in a case where a plurality of cooling hole rows 90 (91, 92, 93, 94) disposed from the axially upstream side to the axially downstream side are compared, the direction, toward the axially downstream side, in which the group of the plurality of cooling holes 89 forming the 91, 92, 93, and 94 extends, coincides with the direction, in which the first opening center line OL1 and the second opening center line OL2 extend, toward the axially downstream side. In addition, a slope thereof with respect to the axial direction is larger, and the inclination thereof with respect to the axial direction line AL is smaller, toward the axially downstream side. Further, in a case of comparing the cooling hole center lines FL of the cooling holes 89 of the cooling hole rows 90, a direction, in which the cooling hole center lines FL of the group of the plurality of cooling holes 89 forming each of the cooling hole rows 91, 92, 93, and 94 extend, coincides with a direction in which the cooling hole center line FL of each of the constituent cooling holes 89 extends. The inclination thereof with respect to the axial direction is smaller, and the inclination thereof with respect to the axial direction line AL is smaller, toward the axially downstream side. Further, also the slopes of the first opening center line OL1 and the second opening center line OL2 of each of the cooling hole rows 91, 92, 93, and 94 with respect to the axial direction are lager, and the inclinations thereof with respect to the axial direction line AL are smaller, toward the axially downstream side.

For example, the first cooling hole row 91 disposed closest to the axially upstream side is constituted by five cooling holes 91*a*, 91*b*, 91*c*, 91*d*, and 91*e* having the same distance thereof and the same inclination of the cooling hole center line FL with respect to the axial direction, toward the leading edge end portion 64 or the negative pressure surface side end portion 66, with reference to the cooling hole 91*a* closest to the vane surface 41. On the other hand, the second cooling hole row 92 disposed adjacent to the axially downstream side with respect to the first cooling hole row 91 is constituted by five cooling holes 92*a*, 92*b*, 92*c*, 92*d*, and 92*e* having the same distance and the same inclination of the cooling hole center line FL with respect to the axial direction, toward the negative pressure surface side end portion 66, with reference to the cooling hole 92*a* closest to the vane surface 41. Further, the first opening center line OL1 of the first cooling hole row 91 is disposed parallel to the equal pressure line IBL1 of the combustion gas G to be described later, and the first opening center line OL1 of the second cooling hole row 92 is disposed parallel to the equal pressure line IBL2 of the combustion gas G.

In a case where the first cooling hole row 91 and the second cooling hole row 92 are compared, the slope of the first opening center line OL1 of the first cooling hole row 91 with respect to the axial direction is larger than the slope of the first opening center line OL1 of the second cooling hole row 92, and the inclination thereof with respect to the axial direction line AL is smaller than that. Further, the slope of the cooling hole center line FL of the second cooling hole row 92 with respect to the axial direction is larger than that of the cooling hole center line FL of the first cooling hole row 91, and the inclination thereof with respect to the axial direction line AL is smaller than that.

That is, the slope of the equal pressure line IBL of the combustion gas G to be described later with respect to the axial direction is larger, and the inclination thereof with respect to the axial direction line AL is smaller, toward the axially downstream side and at a position closer to the negative pressure surface side end portion 66. On the other hand, it is desirable that the opening center lines (first opening center lines OL1) of each of the cooling hole rows 91, 92, 93, and 94 are disposed parallel to the equal pressure line IBL of the combustion gas G. Accordingly, regarding the opening center line OL and the cooling hole center line FL, of which the directions are the extending direction of each of the cooling hole rows 91, 92, 93, and 94, it is desirable to change the inclination of the opening center line (first opening center line OL1) of the cooling hole rows 91, 92, 93, and 94 with respect to the axial direction line AL, along with a change in the inclination of the equal pressure line IBL of the combustion gas G with respect to the axial direction line AL. That is, the inclination of the opening center line OL and the cooling hole center line FL of each of the cooling hole rows 91, 92, 93, and 94 with respect to the axial direction line AL gradually is smaller toward the axially downstream side. Here, an inclination or an angle of the opening center line OL (first opening center line OL1, second opening center line OL2) or the cooling hole center line FL of the plurality of cooling holes 89 constituting the cooling hole row 90 with respect to the axial direction line AL means an inclination or an angle formed between the axial direction line AL and the opening center line OL or the cooling hole center line FL in a counterclockwise direction, in a case where the opening center line OL or the cooling hole center line FL is viewed from a position on the more axially downstream side than a position at which the opening center line OL or the cooling hole center line FL and the axial direction line AL intersect, with respect to the axial direction line AL extending in the axial direction through the leading edge 42.

The number and disposition of the plurality of cooling holes 89 constituting each cooling hole row 90 are selected in consideration of the metal temperature of the gas path surface 71 of the shroud 60 and the like. In the embodiment shown in FIG. 5, four cooling hole rows 90 (first cooling hole row 91, second cooling hole row 92, third cooling hole row 93, and fourth cooling hole row 94) are disposed in the negative pressure surface side leading edge cavity 81 at predetermined distances from the axially upstream side toward the axially downstream direction. The cooling hole rows 90 are not limited to the example of the four cooling hole rows 90, and three or less or five or more cooling hole rows 90 may be disposed. Further, the number of cooling holes 89 constituting each of the cooling hole rows 91, 92, 93, and 94 shown in FIG. 5 is an example. For example, the number of the cooling holes 89 constituting the first cooling hole rows 91 and the second cooling hole rows 92 may be five or more, or may be four or less.

The number of the cooling holes 89 in the third cooling hole row 93 and the fourth cooling hole row 94 may be three or more.

Next, a relationship between the disposition of the cooling holes 89 formed on the gas path surface 71 and pressure distribution of the combustion gas G flowing through the combustion gas passage 47 will be described below. FIG. 5 shows a part of the pressure distribution of the combustion gas G which flows on the gas path surface 71 of the leading edge 42 on the negative pressure surface 44 side of the shroud 60. The equal pressure line IBL of the pressure (static pressure) of the combustion gas G is indicated by the chain line. The pressure of the combustion gas G, which flows into the turbine stator vane 24, is lower in the process of flowing through the combustion gas passages 47 on the negative pressure surface 44 side and the positive pressure surface 45 side from the leading edge 42 to the trailing edge 43. The equal pressure line IBL of the combustion gas G is shown as, for example, a gentle curve. A starting point Xa thereof is set as the vane surface 41 on the negative pressure surface 44 side of the turbine stator vane 24. An end point thereof is set as the vane surface 41 on the positive pressure surface 45 side of the turbine stator vane 24 (not shown in the drawing) adjacent in the circumferential direction.

Here, the equal pressure line IBL means a curve connecting the positions where the pressures (static pressures) of the combustion gas G flowing through the combustion gas passage 47 indicate the same pressure.

The equal pressure line IBL1 shown in FIG. 5 as an example of the equal pressure line IBL of the combustion gas G is shown as a gentle curve indicated by the chain line. The curve connects the starting point Xa on the vane surface 41 of the vane body 40 and an intermediate point Xb disposed on the end surface of the negative pressure surface side end portion 66. The equal pressure line IBL1 shows a part of the total length of the equal pressure line, and is a curve which extends from the intermediate point Xb to the vane surface 41 on the positive pressure surface 45 side of the adjacent turbine stator vane 24, although not shown. The pressure (static pressure) of the combustion gas G is smaller toward the axially downstream side of the gas path surface 71. The slope of the equal pressure line IBL1 heading from the starting point Xa to the intermediate point Xb with respect to the axial direction is larger, and the inclination thereof with respect to the axial direction line AL is smaller, toward the axially downstream side and at a position farther from the vane surface 41 and closer to the negative pressure surface side end portion 66. In FIG. 5, in a case where the equal pressure line IBL1 and the equal pressure line IBL2 formed on the more axially downstream side than the equal pressure line IBL1 are compared, the pressure (static pressure) of the equal pressure line IBL2 is lower than that of the equal pressure line IBL1. Further, as the combustion gas G on the gas path surface 71 flows toward the axially downstream side to approach the negative pressure surface side end portion 66, the distance in the axial direction between the equal pressure line IBL1 and the equal pressure line IBL2 is larger. Regarding the tendency of the increase in distance in the axial direction between the equal pressure lines IBL, the distance in the axial direction in the vicinity of the starting point Xa of the vane surface 41 is small, and the distance in the axial direction gradually is larger as the equal pressure lines IBL are farther from the vane surface 41. As a result, the distance is largest in the vicinity of the intermediate point Xb. The inclination of the equal pressure line IBL with respect to the axial direction has a large change in the vicinity of the vane surface 41, but has a small change in a range of a position far from the vane surface 41 to the intermediate point Xb of the negative pressure surface side end portion 66.

FIG. 5 shows, as an example, the first cooling hole row 91, which is disposed close to the leading edge end portion 64 closest to the axially upstream side, among the plurality of cooling hole rows 90, and explains disposition of the cooling hole rows 90 and a relationship between the combustion gas G and the equal pressure line IBL. The first cooling hole rows 91 are constituted by a group of five cooling holes 89 (91$a$, 91$b$, 91$c$, 91$d$, 91$e$), and are arranged at equal distances from a position close to the vane surface 41 in the direction of the negative pressure surface side end portion 66. Examples of the equal pressure line IBL of the combustion gas G in the vicinity of the first cooling hole row 91 include the equal pressure line IBL1. The equal pressure line IBL1 is formed by drawing a gentle curve from a starting point Xa on the vane surface 41 on the negative pressure surface 44 side of the leading edge 42 side of the vane body 40 to the intermediate point Xb on the end surface of the negative pressure surface side end portion 66.

On the other hand, the plurality of cooling holes 89 of the first cooling hole row 91 are disposed such that the first opening center line OL1 connecting the outlet openings 89$b$ of the plurality of cooling holes 89 of the first cooling hole row 91 is set to be approximately parallel to the equal pressure line IBL1. However, the equal pressure line IBL1 is a gentle curve. Thus, in order to dispose the opening center line OL (first opening center line OL1) of the cooling holes 89 exactly parallel to the equal pressure line IBL1, it is desirable that the opening center line OL is also not a straight line but a curve. However, the cooling hole 89 is formed by machining or electric discharge machining. Therefore, it is desirable that the plurality of cooling holes 89 are disposed such that the first opening center line OL1 is a straight line from the viewpoint of simplification of processing work. Accordingly, FIG. 5 shows the first opening center line OL1 of the plurality of cooling holes 89 of the first cooling hole row 91 which is disposed in the vicinity of the equal pressure line IBL1 extending from the starting point Xa on the vane surface 41 on the leading edge 42 side of the vane body 40 to the intermediate point Xb of the negative pressure surface side end portion 66. Here, it is desirable to select two cooling holes 89 of the cooling hole 91$a$ disposed closest to the vane surface 41 side and the cooling hole 91$b$ adjacent to each other in the direction from the vane surface 41 to the negative pressure surface side end portion 66, connect the centers of the outlet openings 89$b$ of the cooling hole 91$a$ and the cooling hole 91$b$, and select the first opening center line OL1 having a straight line shape extending in parallel along the equal pressure line IBL1.

In the above description, the cooling hole 91$a$ adjacent to the cooling hole 91$a$ closest to the vane surface 41 and the adjacent cooling hole 91$b$ are selected. However, a combination of two adjacent cooling holes 89 in the same cooling hole row 90 may be selected. That is, the disposition of the cooling holes 89 of the first cooling hole row 91 may be selected such that the first opening center line OL1 is parallel to the equal pressure line IBL1. The first opening center line OL1 is determined from the cooling holes 91$d$ and 91$e$ as a combination of the other cooling holes 89 constituting the same first cooling hole row 91. Simple selection of the first opening center line OL1 having a straight line shape based on the outlet openings 89$b$ of two adjacent cooling holes 89 in the same cooling hole row 90 is preferable selection in terms of both improvement of the cooling performance of the shroud 60 and simplification of the processing work. This idea is the same in selection of the second opening center line OL2. Further, as the two adjacent cooling holes 89 used in a case of selecting the second opening center line OL2, it is desirable that the two adjacent cooling holes 89 used in a case of selecting the first opening center line OL1 are combined.

As described above, the disposition of the plurality of cooling holes 89 in the cooling hole row 90 is selected such that the metal temperature, the thermal stress, and the like of the bottom plate 69 forming the shroud 60 are within the allowable values. Further, it is desirable to select the cooling holes 89 and the inclination of the cooling hole rows 90 with respect to the axial direction, in consideration of the relationship between the combustion gas G flowing on the gas path surface 71 and the equal pressure line IBL. As described above, the cooling structure of the shroud 60 is formed of a combination of impingement cooling performed by the collision plate 85 and film cooling performed by the cooling holes 89 of the bottom plate 69. By applying the two combinations, thermal damage from the combustion gas G of the bottom plate 69 of the shroud 60 is suppressed. As shown in FIG. 4, the cooling air Ac supplied from the outside to the shroud 60 is supplied to the outer side cavity 82 and is supplied to the inner side cavity 83 through the through-holes 86 formed in the collision plate 85. The cooling air Ac is decompressed in the process of passing through the through-holes 86 of the collision plate 85. Further, the cooling air Ac becomes a jet flow in the process of flowing into the inner side cavity 83 from the through-hole 86, and collides with the inner surface 70 of the bottom plate 69, thereby performing impingement cooling (collision cooling) on the inner surface 70. The cooling air Ac after the impingement cooling of the inner surface 70 performs film cooling on the gas path surface 71 in a process of discharging the cooling air Ac from the cooling holes 89 formed in the bottom plate 69 to the combustion gas passage 47 on the gas path surface 71 side.

In the disposition of the cooling holes 89 of the cooling hole rows 90 disposed in the negative pressure surface side leading edge cavity 81, a characteristic element affecting the cooling of the shroud 60 is film cooling performed by the cooling holes 89. As described above, the combustion gas G flowing into the combustion gas passage 47 of the turbine stator vane 24 has a pressure (static pressure), which becomes lower as shown in the change in the equal pressure line IBL in the process of flowing down the gas path surface 71 of the shroud 60 to the axially downstream side. On the other hand, an amount of cooling air, which is discharged from the inner side cavity 83 of the shroud 60 into the combustion gas passage 47 through the cooling holes 89, depends on the differential pressure (pressure difference) between the inlet opening 89$a$ and the outlet opening 89$b$ of the cooling hole 89, that is, the differential pressure between the inner side cavity 83 of the cooling hole 89 and the combustion gas passage 47.

Due to a difference in pressure drop of the combustion gas G in a process in which the combustion gas G flows on the gas path surface 71, a difference occurs in the amount of cooling air flowing through the cooling holes 89 of the cooling hole row 90. In the inner side cavity 83 to which the inlet opening 89$a$ on the upstream side of the cooling hole 89 is connected, the same pressure is kept within the same space. On the other hand, the pressure of the combustion gas G on the gas path surface 71 side, to which the outlet opening 89*b* on the downstream side of the cooling hole 89 is connected, is lower toward the axially downstream side. Accordingly, depending on the disposition of the plurality of cooling holes 89 in the cooling hole row 90, a difference in the differential pressure (pressure difference) of the cooling holes 89 may occur in the plurality of cooling holes 89 constituting the same cooling hole row 90. As a result, there is a possibility that a variation in amount of cooling air to be discharged may occur. The variation in amount of cooling air in the plurality of cooling holes 89 constituting the cooling hole row 90 causes non-uniform film cooling and causes non-uniform metal temperature distribution in the bottom plate 69. In order to improve this point, it is desirable to select the disposition of the plurality of cooling holes 89 in the same cooling hole row 90 such that the first opening center line OL1 of the plurality of cooling holes 89 constituting the same cooling hole row 90 is approximately parallel to the equal pressure line IBL of the combustion gas G in the vicinity of each of the cooling hole rows 91, 92, 93, and 94. The disposition of the plurality of cooling holes 89 of the same cooling hole row 90 may be set such that the equal pressure line IBL of the first opening center line OL1 of the cooling hole row 90 and the equal pressure line IBL of the combustion gas G are approximately parallel to each other. In such a case, the plurality of cooling holes 89 constituting the same cooling hole row 90 are able to keep the same differential pressure. The differential pressures of the plurality of cooling holes 89 of the same cooling hole row 90 may be the same. In such a case, the amounts of cooling air discharged from the plurality of cooling holes 89 of the same cooling hole row 90 to the gas path surface 71 are made uniform and the same. Thus, the film cooling on the axially downstream side from the positions of the plurality of cooling holes 89 in the same cooling hole row 90 is made uniform. As a result, the temperature distribution of the gas path surface 71 of the shroud 60 is leveled, and the thermal damage of the bottom plate 69 is suppressed. Thus, the thermal stress caused by the non-uniform temperature distribution of the bottom plate 69 is reduced.

As described above, the pressure (static pressure) of the combustion gas G is smaller toward the axially downstream side. However, the distance in the axial direction between the equal pressure lines IBL of the combustion gas G tends to become larger toward the axially downstream side. Accordingly, the distance in the axial direction of the first opening center line OL1 of each of the cooling hole rows 91, 92, 93, and 94 disposed parallel to the equal pressure line IBL also gradually is larger toward the axially downstream side. As a result, the gas path surface 71 on the axially downstream side from the plurality of cooling holes 89 of each of the cooling hole rows 91, 92, 93, and 94 is uniformly cooled.

As shown in FIG. 5, the slope of the equal pressure line IBL of the combustion gas G with respect to the axial direction is larger toward the axially downstream side and at a position closer to the negative pressure surface side end portion 66. Accordingly, also regarding the inclination of the axial direction of the first opening center line OL1 having a straight line shape of the plurality of cooling hole rows 90, the slope thereof with respect to the axial direction is larger in accordance with the change in the equal pressure line IBL, and the inclination thereof with respect to the axial direction line AL gradually is smaller, toward the axially downstream side. As a result, as shown in FIG. 5, regarding the first opening center line of the plurality of cooling hole rows 90, that is, the first opening center line OL1 extending to the leading edge 42 side on the side opposite to the negative pressure surface side end portion 66 in the circumferential direction with respect to the positions of the cooling holes 89 (91*a*, 92*a*, 93*a*, 94*a*) closest to the vane surface 41, the inclination thereof with respect to the axial direction line AL is smaller toward the axially downstream side. On the other hand, a circular leading edge region 42*a* (first region) indicated by the broken line inscribed in the outer edge 46*a* of the fillet portion 46 formed on the more axially upstream side than the position of the leading edge 42 with the position of the leading edge 42 as the center is defined. In such a case, the first opening center line OL1 of the plurality of cooling hole rows 90 passes through the leading edge region 42*a* (first region). From another viewpoint, the plurality of cooling hole rows 90 (91, 92, 93, 94), which are constituted by the plurality of cooling holes 89 formed in the negative pressure surface side leading edge cavity 81, has the first opening center line OL1. The first opening center line OL1 starts from the circular leading edge region 42*a* (first region) formed around the leading edge 42, and connects the outlet openings 89*b* of at least two cooling holes 89, which are adjacent to each other in the direction of the negative pressure surface side end portion 66 in which the cooling hole rows 90 extend, among the plurality of cooling holes 89 constituting the cooling hole rows 90. That is, the first opening center line OL1 of at least one cooling hole row 90 among the plurality of cooling hole rows 90 constituted by the plurality of cooling holes 89 formed in the negative pressure surface side leading edge cavity 81 is formed in a straight line shape. The straight line shape starts from the leading edge region 42*a* (first region) centered on the leading edge 42, connects the centers of the outlet openings 89*b* of a plurality of cooling holes 89 constituting the same cooling hole row 90, and extends to the negative pressure surface side end portion 66. The reason that the disposition of the first opening center line OL1 of the cooling hole row 90 is established is as follows. The inclination thereof with respect to the axial direction line AL is smaller toward the axially downstream side while the following relationship is kept. The plurality of cooling hole rows 90 formed in the negative pressure surface side leading edge cavity 81 are radially disposed so as to surround the vane surface 41 along the vane surface 41 of the vane body 40, and the first opening center line OL1 of each of the cooling hole rows 91, 92, 93, and 94 is disposed parallel to the equal pressure line IBL of the combustion gas G.

As a characteristic element in which the equal pressure line IBL of the combustion gas G affects the disposition of the cooling hole rows 90 of the present embodiment, there is a point where the equal pressure line IBL and the first opening center line OL1 of the cooling hole row 90 have a parallel positional relationship. In addition, as described above, there is an inclination of the cooling hole center line FL of the cooling hole row 90 with respect to the axial direction.

As shown in FIG. 5, the combustion gas G, which flows on the gas path surface 71 on the negative pressure surface 44 side on the leading edge 42 side of the shroud 60, flows along the vane surface 41 which has a curved surface having a convex shape. A region, in which the plurality of cooling holes 89 formed in the negative pressure surface side leading edge cavity 81 are disposed, is a region in which the inclination of the curved surface of the vane surface 41 with respect to the axial direction line AL gradually is smaller toward the axially downstream side from the axially upstream side and at a position on the vane surface 41 of the vane body 40 closer to the negative pressure surface side end portion 66. In this region, the cooling hole center line FL is disposed in a direction in which the cooling hole center line FL is inclined toward the vane surface 41 side rather than a direction orthogonal to the opening center lines OL, with respect to a direction in which the opening center lines OL of the plurality of cooling holes 89 extend. Further, the inclinations of the opening center lines OL of the plurality of cooling hole rows 90 with respect to the axial direction line AL become smaller toward the axially downstream side. Therefore, the inclination of the cooling hole center line FL of the same cooling hole row 90 with respect to the axial direction line AL also is smaller toward the axially downstream side. In addition, it is desirable that an inclination or an angle formed between the cooling hole center line FL of the cooling holes 89 of each of the cooling hole rows 91, 92, 93, and 94 and the opening center line OL (first opening center line OL1) is kept the same at any position in the axial direction. The inclination of the cooling hole center line FL of the same cooling hole row 90 with respect to the opening center line OL may not be kept, and the cooling hole center line FL may be excessively inclined toward the vane surface 41 side in accordance with the position of the cooling hole row 90 in the axial direction. In such a case, the flow of the cooling air Ac discharged from the cooling hole 89 disturbs the flow of the combustion gas G.

Here, for the positional relationship between the first opening center line OL1 and the second opening center line OL2 of the cooling hole rows 90, the first cooling hole row 91 will be described as an example. As described above, the cooling hole center lines FL of the plurality of cooling holes 89 constituting the same cooling hole row 90 have the same length and the same inclination. Accordingly, as shown in FIG. 5, the first opening center line OL1 of the first cooling hole row 91 is a straight line starting from the leading edge region (first region) 42a. Then, the second opening center line OL2, which connects the inlet openings 89a of the plurality of cooling holes 89 of the same cooling hole rows 90 and extends to the leading edge 42 side, is also formed of a straight line.

Further, the second opening center line OL2 of the same first cooling hole row 91 is formed in a straight line starting from the upstream side leading edge region (second region) 42b at a predetermined position on the more axially upstream side than the position of the leading edge 42 on the axial direction line AL passing through the leading edge 42. Here, the upstream side leading edge region (second region) 42b is a region formed in a circular shape. The circular shape is centered on a position at a distance corresponding to an axial direction length of the cooling hole center line FL of the first cooling hole row 91, on the axial direction line AL on the more axially upstream side than the position of the leading edge 42. The circular shape has the same radius as the leading edge region 46a and is indicated by the broken line.

In the above description, the disposition of the cooling holes 89 and the functions, actions, and effects thereof have been described focusing on the first cooling hole row 91. The selection of the disposition of the cooling holes 89 of the other cooling hole rows 90 (92, 93, 94,) can also be set in the same manner as in the case of the first cooling hole row 91 described above. However, as described above, the inclination of the opening center line OL of the other cooling hole row 90 with respect to the axial direction line AL changes more toward the axially downstream side. Accordingly, among the opening center lines OL of all the cooling hole rows 90, the first opening center line OL1 of at least one cooling hole row 90 starts from the leading edge region (first region) 42a. The second opening center line OL2 starts from the upstream side leading edge region (second region) 42b, and extends in the direction of the leading edge end portion 64 or the negative pressure surface side end portion 66. By selecting the above-mentioned disposition of the cooling holes 89, the negative pressure surface side leading edge cavity 81 is appropriately cooled, and thermal damage and thermal stress of the bottom plate 69 of the shroud 60 are suppressed from occurring. Further, appropriate disposition of the cooling holes 89 reduces the amount of cooling air and improves the efficiency of the gas turbine.

Second Embodiment

The following description relates to a second embodiment of the cooling structure of rotation of the negative pressure surface side leading edge cavity 81 of the shroud 60, and will be described with reference to FIGS. 6 and 7. FIG. 6 shows a plane section of the shroud 60 of the present embodiment and is a plan view taken along the line B-B of FIG. 4. FIG. 7 is a detailed view showing a part of a plan view of the shroud 60 of the present embodiment shown in FIG. 6.

The cooling structure of the present embodiment relates to an embodiment in which the disposition of the cooling holes 89 is changed as compared with the structure of the first embodiment of the plurality of cooling holes 89 of the cooling hole rows 90 formed in the shroud 60. The cooling structure constituting the present embodiment is different from that of the first embodiment in terms of the concept of disposition of the plurality of cooling holes 89 constituting the film cooling structure as compared with the combination of the impingement cooling structure and the film cooling structure in the first embodiment. The impingement cooling structure shown in FIGS. 3 and 4 is also applied to the present embodiment.

Cooling hole rows 95 of the present embodiment shown in FIG. 6 are constituted by a first cooling hole row 96, a second cooling hole row 97, and a third cooling hole row 98, and a fourth cooling hole row 99, in order from the axially upstream side to the axially downstream side. Each of the cooling hole rows 96, 97, 98, and 99 has a plurality of cooling holes 89.

In FIG. 6, disposition of the plurality of cooling holes 89 in the plurality of cooling hole rows 95 (96, 97, 98, 99) according to the present embodiment is indicated by the solid line. For comparison, the disposition of the plurality of cooling holes 89 in a plurality of cooling hole rows 90a (91, 92, 93, 94) as a modification example of the first embodiment described below is indicated by the broken line.

The present embodiment also has the same configuration as the first embodiment in terms of the number of cooling hole rows, which constitute the plurality of cooling hole rows 95 disposed on the gas path surface 71 of the negative pressure surface side leading edge cavity 81 of the shroud 60, and the number of the cooling holes 89 which constitute the cooling hole rows 96, 97, 98, and 99.

As described above, in the first embodiment shown in FIG. 5, the disposition of the cooling holes 89 is selected such that the plurality of cooling holes 89 indicated by the solid lines of the plurality of cooling hole rows 90 are approximately parallel to the equal pressure line IBL1 of the combustion gas G in the vicinity of the first opening center line OL1 of each of the cooling hole rows 91, 92, 93, and 94. However, under different operating conditions of the gas turbine such as a difference in the combustion gas temperature, a high temperature part of the gas path surface 71 of the shroud 60 is wider than in the first embodiment. Thus, it may be desired to enhance cooling up to a position closer to the vane surface 41. In such a case, in a state of keeping the extending directions of the opening center lines OL (the first opening center line OL1 and the second opening center line OL2) of the plurality of cooling holes 89 constituting the cooling hole rows 90 of the first embodiment, it may be desired that the position of the group of the plurality of cooling holes 89 in each of the cooling hole rows 91, 92, 93, and 94 is disposed closer to the vane surface 41 than that in the first embodiment. In the modification example of the first embodiment, the disposition of the plurality of cooling holes 89 of the cooling hole row 90 of the first embodiment disposed closer to the vane surface 41 is disposition of the cooling holes 89 of the cooling hole row 90a.

However, in the processing of the cooling holes 89, processing of holes penetrating the bottom plate 69 may be performed in a direction from the gas path surface 71 side toward the inner side cavity 83 side by machining or electric discharge machining. In a case where such hole processing is performed, the vane body 40 may become an obstacle in accordance with the position of the cooling hole 89 closest to the vane surface 41 of each cooling hole row 90a (91, 92, 93, 94) and the extending direction of the cooling hole center line FL thereof. Therefore, it may be difficult to process the cooling hole 89. In order to avoid such interference with the vane body 40 during processing of the cooling hole 89, it may be desirable to correct the inclination of the cooling hole center line FL of the cooling hole 89 with respect to the axial direction by slightly changing the extending direction of the cooling hole 89.

FIG. 6 shows comparison between the disposition of the cooling holes 89 of the cooling hole row 90a as the modification example of the first embodiment and the disposition of the plurality of cooling holes 89 of the cooling hole row 95 of the present embodiment after the change, on the basis of the above-mentioned concept. The cooling hole row 90a of the modification example is a virtual cooling hole row. The drawing about the disposition of the cooling holes 89 shown in FIG. 6 shows comparison between the disposition in which the plurality of cooling holes 89 of the cooling hole rows 90a as modification examples of the first embodiment are indicated by the broken lines and the disposition in which the plurality of cooling holes 89 of the cooling hole rows 95 (96, 97, 98, and 99) of the present embodiment are indicated by the solid lines.

In the disposition of the cooling hole rows 90a (91, 92, 93, 94) as a modification example of the first embodiment shown in FIGS. 6 and 7, each group of the cooling holes 89 of each of the cooling hole rows 91, 92, 93, and 94 of the first embodiment is moved to the vane surface 41 side, in state of keeping: the number of the plurality of cooling holes 89 constituting each of the cooling hole rows 91, 92, 93, and 94 of the first embodiment; the distances between the cooling holes 89 in the extending direction of each group of the cooling hole rows 91, 92, 93, and 94 and in the extending direction of the cooling hole rows 90; and the inclination of the cooling hole center line FL with respect to the axial direction. Accordingly, the following are the same as those of the first embodiment: the position and extending direction of the opening center line OL (first opening center line OL1, second opening center line OL2) of each cooling hole row 90a (91, 92, 93, 94) having the configuration of the modification example of the first embodiment. Further, the following are the same as those in the first embodiment: the inclinations of the cooling hole center lines FL of the plurality of cooling holes 89 of the cooling hole rows 90a (91, 92, 93, 94) having the configuration of the modification example with respect to the axial direction; the distances of the cooling holes 89 in the extending direction of each group of the cooling hole rows 90a (91, 92, 93, 94); and the inclinations of the cooling hole center lines FL with respect to the opening center line OL.

Referring to FIGS. 6 and 7, a description will be given of a concept in which the disposition of the cooling holes 89 of the cooling hole row 90a as a modification example of the first embodiment is changed to the disposition of the cooling holes 89 of the cooling hole row 95 of the present embodiment. As described above, in order to avoid interference between the vane body 40 and the cooling holes 89 (91aa, 92aa, 93aa, 94a) closest to the vane surface 41 of each cooling hole row 90a (91, 92, 93, 94) showing the modification example of the first embodiment in a case of processing the cooling holes 89, it is desirable to correct the inclination of the cooling holes 89 with respect to the axial direction. However, among the cooling hole rows 90a, the fourth cooling hole row 94 is disposed on the most downstream side in the axial direction. Thus, the inclination of the cooling hole center line FL with respect to the axial direction line AL is smaller than that of the other cooling holes 89 (91aa, 92aa, 93aa) on the axially upstream side. As a result, the possibility of interference with the vane body 40 is small. Accordingly, the disposition of the cooling holes 94a of the modification example is kept without changing the inclination of the cooling holes 94a closest to the vane surface 41 of the fourth cooling hole row 94.

On the other hand, in order to avoid interference between the cooling hole 89 closest to the vane surface 41 in the other cooling hole row 90a (91, 92, 93) of the modification example and the vane body 40 during processing, the inclinations of the following with respect to the axial direction are changed: cooling holes 91aa of the first cooling hole row 91 of the cooling hole row 90a of the modification example; cooling holes 92aa of the second cooling hole row 92; and cooling holes 93aa of the third cooling hole 93. In such a procedure, in the disposition of the cooling holes 89 after changing the position of the cooling holes 89 closest to the vane surface 41, the cooling holes 89 (96a, 97a, 98a, 99a) are disposed closest to the vane surface 41 in the cooling hole rows 95 (96, 97, 98, 99) of the present embodiment. The cooling holes 99a of the fourth cooling hole row 99 of the present embodiment have the same disposition as the cooling holes 94a of the fourth cooling hole row 94 of the cooling hole rows 90a of the modification example of the first embodiment, and there is no change in the positions thereof. A configuration of the fourth cooling hole row 99 of the present embodiment shown in FIG. 6 is the same as a configuration of the fourth cooling hole row 94 of the cooling hole row 90a of the modification example. Therefore, the reference numerals of the cooling holes 89 having the configuration represent only the cooling holes 99a closest to the vane surface 41 of the present embodiment and the cooling holes 99c farthest from the vane surface 41, and the reference numerals of the cooling holes 89 of the modification example are omitted.

Next, after setting of the positions of the cooling holes 89 (96a, 97a, 98a, 99a) closest to the vane surface 41 in the cooling hole rows 95 of the present embodiment, the positions of the other cooling holes 89 disposed in the direction away from the vane surface 41 in each of the cooling hole rows 96, 97, 98, and 99 are selected. In such a case, the cooling holes 89 constituting each of the cooling hole rows 96, 97, 98, and 99 are based on the cooling holes 89 (96a, 97a, 98a, 99a) closest to the vane surface 41 after the disposition is changed, and have the same inclinations with respect to the axial direction as the cooling holes 89 (96a, 97a, 98a, 99a). The cooling holes 89 are disposed at the same distance as the cooling hole 89 of the cooling hole row 90a of the modification example of the first embodiment and at an inclination and an distance of the same cooling hole center line FL. The cooling holes 89 are formed in a direction away from the vane surface 41 toward the leading edge end portion 64 or the negative pressure surface side end portion 66.

Next, the extending direction of the cooling hole rows 96, 97, 98, and 99 is not set to be the same as the extending direction of the cooling hole rows 91, 92, 93, and 94 of the first embodiment, that is, the extending direction of the opening center line OL (the first opening center line OL1 and the second opening center line OL2) of the cooling hole row 90a (91, 92, 93, 94) of the modification example. Thus, it is desirable that the cooling hole rows 96, 97, 98, and 99 are arranged such that an inclination of the extending direction with respect to the axial direction is larger and an angle of the inclination thereof with respect to the axial direction line AL is lager, on the more axially upstream side than each of the cooling hole rows 91, 92, 93, and 94 of the first embodiment. The reason for the above description is as follows. The opening center lines OL (first opening center line OL1 and second opening center line OL2) of the cooling holes 89 of the cooling hole rows 96, 97, 98, and 99 of the present embodiment may be made to extend in the same direction as the opening center lines OL of the cooling hole rows 91, 92, 93, and 94 of the first embodiment. In such a case, the inclination of the cooling hole center line FL with respect to the opening center line OL is more inclined toward the vane surface 41 side than the inclination of the cooling hole center line FL of the first embodiment. Thus, the flow of the cooling air discharged from the excessively inclined cooling hole 89 disturbs the flow of the combustion gas G flowing along the vane surface 41.

On the other hand, the cooling holes 89 of the cooling hole rows 96, 97, 98, and 99 of the present embodiment may be arranged such that the inclination thereof with respect to the axial direction is larger on the more axially upstream side than the positions of the cooling holes 89 of the cooling hole rows 91, 92, 93, and 94 of the first embodiment. In such a case, the opening center line OL of the cooling hole row 90 of the first embodiment is farther from the axially upstream side than extending direction of the equal pressure line IBL of the combustion gas G in the vicinity of the opening center line OL. Thus, relationship of parallelism between the opening center line OL and the equal pressure line IBL is slightly broken. However, the opening center line OL is formed approximately parallel to the other equal pressure line IBL on the axially upstream side of the equal pressure line IBL. Therefore, fluctuation in amount of cooling air discharged from the cooling holes 89 for each cooling hole row is suppressed to be small. On the basis of the above-mentioned concept of changing the disposition of the cooling holes 89, the disposition of the cooling holes 89 in the cooling hole rows 95 (96, 97, 98, 99 (94)) of the present embodiment is selected. It should be noted that the fourth cooling hole row 99 has the same disposition as the fourth cooling hole row 94 of the modification example of the first embodiment, and it is not necessary to change the disposition. In addition, as the opening center line OL of the cooling hole row 95 of the present embodiment, FIG. 7 shows the first opening center line OL1 and the second opening center line OL2 of the cooling hole rows 96 and 97. As the opening center line OL of the cooling hole rows 98 and 99, FIG. 6 shows only the first opening center line OL1. It may be considered that, similarly to the other cooling hole rows, the second opening center line OL2 of the cooling hole rows 98 and 99 is a straight line that is parallel to the first opening center line OL1, that connects the centers of the inlet openings 89a of the cooling holes 89, and that extends from an intermediate leading edge region 42d as a starting point to the negative pressure surface side end portion 66.

Next, referring to FIG. 7, a specific concept of the disposition and the disposition change of the cooling hole rows 95 of the present embodiment will be described below. FIG. 7 is a detailed view showing comparison about the disposition of cooling holes 89 between the selected combination of the first cooling hole row 96 and the second cooling hole row 97 in the cooling hole rows 95 of the present embodiment shown in FIG. 6, and the selected combination of the first cooling hole row 91 and the second cooling hole row 92 in the first cooling hole rows 90a of the modification example of the first embodiment. The first cooling hole row 91 of the cooling hole row 90a of the modification example of the first embodiment is constituted by the plurality of cooling holes 89 (91aa, 91bb, 91cc, 91dd, 91ee). The second cooling hole row 92 is constituted by the plurality of cooling holes 89 (92aa, 92bb, 92cc, 92dd, 92ee). The first cooling hole row 96 of the present embodiment is constituted by the plurality of cooling holes 89 (96a, 96b, 96c, 96d, 96e). The second cooling hole row 97 is constituted by the plurality of cooling holes 89 (97a, 97b, 97c, 97d, 97e).

A specific concept of the change of the disposition of the cooling holes 89 will be described by exemplifying the cooling holes 89 (91aa, 91bb, 91cc, 91dd, 91ee) of the first cooling hole row 91 of the cooling hole row 90a, as a modification example of the first embodiment. As described above, it is necessary for the cooling hole 91aa closest to the vane surface 41 to avoid interference with the vane body 40 in a case of processing the cooling holes 89. As shown in FIG. 7, in order to avoid the interference of the cooling hole 91aa with the vane body 40 during hole processing, it is desirable to rotate the inclination of the cooling hole 91aa with respect to the axial direction around the position of the outlet opening 89b of the cooling hole 91aa, by an angle α1 in the counterclockwise direction on the side closer to the vane surface 41. A new position of the cooling hole 89 after the change corresponds to a position of the cooling hole 96a which is closest to the vane surface in the first cooling hole row 96 of the cooling hole rows 95 of the present embodiment and which is indicated by the solid line.

The disposition of the group of the plurality of cooling holes 89 constituting the first cooling hole row 96 in the present embodiment is based on the position of the cooling hole 96a which is changed on the basis of the above-mentioned disposition correction method and which is closest to the vane surface 41. The group is disposed, in the direction from the vane surface 41 to the leading edge end portion 64, in a state of keeping an inclination thereof with respect to axial direction the same as the cooling hole 96a and the distance between the cooling holes 89 the same as that in the first embodiment. A direction in which the first cooling hole row 96 extends is a direction away from the equal pressure line IBL1 on the more axially upstream side than a direction in which the equal pressure line IBL1 of the combustion gas G extends. This direction is slightly deviated from a direction in which a relationship of parallelism between the first opening center line OL1 and the equal pressure line IBL1 is established. However, the first opening center line OL1 is formed approximately parallel to the equal pressure line IBL3 on the more axially upstream side than the equal pressure line IBL1. Further, it is desirable that an inclination (angle) of the cooling hole center line FL of the first cooling hole row 96 with respect to the opening center line OL (first opening center line OL1) is set to be the same as an inclination of the cooling hole center line FL of the first cooling hole row 91 of the first embodiment with respect to the opening center line OL (the first opening center line OL1).

First, the direction in which the first cooling hole row 96 of the present embodiment extends is not set to be the same as the direction in which the first opening center line OL1 of the first cooling hole row 91 of the cooling hole row 90a of the modification example extends. The first cooling hole row 96 is disposed in a direction in which the inclination thereof with respect to the axial direction is larger on the more axially upstream side than the cooling hole row 91. The inclination is set to be the same as the inclination of the cooling hole center line FL of the first cooling hole row 91 of the first embodiment with respect to the opening center line OL (first opening center line OL1). The reason for this is, as described above, to prevent the flow of the cooling air, which is discharged from the cooling holes 89 excessively inclined toward the vane surface 41 side, from disturbing the flow of the combustion gas G, in a state where the inclination of the cooling hole center line FL of the cooling hole 89 with respect to the opening center line OL is kept the same.

The number of cooling holes 89 (96a, 96b, 96c, 96d, 96e) constituting the first cooling hole row 96 of the present embodiment is the same as that of the first embodiment. The group of the cooling holes 89 constituting the first cooling hole row 96 in the present embodiment is disposed in a direction in which the inclination thereof with respect to the axial direction is larger than that of the first cooling hole row 91 of the first embodiment. The group is formed on a side close to the leading edge end portion 64 on the axially upstream side.

Next, a concept of change in disposition of the cooling holes 89 of the second cooling hole row 92 disposed adjacent to the axially downstream side of the first cooling hole row 91 of the modification example of the first embodiment is also the same as that of the first cooling hole row 91. It is necessary for the cooling hole 92aa closest to the vane surface 41 to avoid interference with the vane body 40 in a case of performing hole processing the cooling holes 89 (92aa, 92bb, 92cc, 92dd, 92ee) of the second cooling hole row 92 of the cooling hole row 90a of the modification example. As shown in FIG. 7, in order to avoid the interference of the cooling hole 92aa with the vane body 40 during hole processing, it is desirable to rotate the inclination of the cooling hole 92aa with respect to the axial direction around the position of the outlet opening 89b of the cooling hole 92aa, by an angle α2 on the side closer to the vane surface 41. A new position of the cooling hole 89 after the change corresponds to a position of the cooling hole 97a which is closest to the vane surface in the second cooling hole row 97 of the present embodiment and which is indicated by the solid line. The disposition of the cooling holes 89 constituting the second cooling hole row 97 in the present embodiment is based on the position of the cooling hole 97a which is set as described above.

The group is disposed, in the direction from the vane surface 41 to the negative pressure surface side end portion 66, in a state of keeping an inclination thereof with respect to axial direction the same as the cooling hole 97a and the distance between the cooling holes 89 the same as that in the first embodiment. The number of cooling holes 89 (97a, 97b, 97c, 97d, 97e) constituting the second cooling hole row 97 is the same as that of the first embodiment. The second cooling hole row 97 in the present embodiment is disposed in a direction in which the inclination thereof with respect to the axial direction is larger than that of the second cooling hole row 92 of the first embodiment. The group is formed on a side close to the leading edge end portion 64 on the axially upstream side. In addition, similarly to the first cooling hole row 96 of the present embodiment, also in the second cooling hole row 97, it is desirable that an inclination of the cooling hole center line FL of the first cooling hole row 96 with respect to the opening center line OL (first opening center line OL1) is set to be the same as an inclination of the cooling hole center line FL of the second cooling hole row 92 of the first embodiment with respect to the opening center line OL (the first opening center line OL1).

The following concept is also the same as the above-mentioned concept. The disposition of the third cooling hole row 93 and the fourth cooling hole row 94 of the modification example of the first embodiment is corrected, and the disposition of the cooling holes 89 of the third cooling hole row 98 and the fourth cooling hole row 99 of the present embodiment is selected. However, as the disposition of the fourth cooling hole row 99 of the present embodiment, the same disposition as that of the fourth cooling hole row 94 of the modification example is kept. As a result, it is not necessary to correct the disposition. The number of cooling hole rows and the number of cooling holes 89 constituting each of the cooling hole rows 96, 97, 98, and 99 of the present embodiment may be different from those of the first embodiment, depending on the operating conditions of the gas turbine.

As described above, the disposition of the cooling holes 89 of the cooling hole row 90a of the modification example of the first embodiment is changed, and the disposition of the cooling holes 89 of the cooling hole row 95 of the present embodiment is selected. In such a case, new disposition of the plurality of cooling holes 89 in the cooling hole row 95 is determined by rotating the cooling holes 89 in a counterclockwise direction around the position of the outlet opening 89b of the cooling hole 89 closest to the vane surface 41. By rotating the disposition of the cooling holes 89 in the counterclockwise direction, the relationship of parallelism between the equal pressure line IBL and the first opening center line OL1 of the cooling hole row 90 of the first embodiment is broken. However, the relationship of parallelism between the other equal pressure line IBL on the upstream side and the first opening center line OL1 of the cooling hole row 95 of the present embodiment after the change in disposition is kept. Therefore, the amounts of cooling air discharged from the cooling holes 89 of the cooling hole rows 96, 97, 98, and 99 are made uniform, and fluctuation in amount of cooling air is small.

Further, similarly to the cooling hole row 90 of the first embodiment, also in the cooling hole row 95 of the present embodiment, it is desirable that an inclination of the cooling hole center line FL of the plurality of cooling holes 89 constituting the cooling hole row 95 with respect to the opening center line OL (first opening center line OL1, second opening center line OL2) is set to be the same at any position in the axial direction. The reason for this is as follows. The inclination of the cooling hole center line FL with respect to the opening center line OL may be changed by a difference in the position of the cooling hole row 95 in the axial direction. In such a case, the cooling hole center line FL may be excessively inclined toward the vane surface 41 side or toward the opposite vane surface 41 side. Thus, the flow of the cooling air Ac discharged from the cooling hole 89 disturbs the flow of the combustion gas G, which is not desirable.

As described above, the disposition of the cooling hole 89 of the cooling hole row 95 of the present embodiment is based on the disposition of the cooling hole 89 of the cooling hole row 90a of the modification example of the first embodiment. A group of the cooling hole rows 90a (91, 92, 93, 94) is rotated in the counterclockwise direction around the position of the outlet opening 89b of the cooling hole 89 (91aa, 92aa, 93aa, 94aa) closest to the vane surface 41 in each of the cooling hole rows 90a (91, 92, 93, 94 of the modification example. In such a manner, the disposition of each of the cooling hole rows 96, 97, 98, and 99 of the present embodiment is selected. It should be noted that an angle, by which each of the cooling hole rows 96, 97, 98, and 99 is rotated in the counterclockwise direction, is as small as the cooling hole row 95 on the axially downstream side. As a result, the opening center line OL (first opening center line OL1, second opening center line OL2) of each of the cooling hole rows 96, 97, 98, and 99 of the present embodiment passing through the outlet opening 89b or the inlet opening 89a of the cooling hole 89 closest to the vane surface 41 has a larger inclination with respect to the axial direction than the opening center line OL of each cooling hole row 90a (91, 92, 93, 94) of the modification example, and has a larger inclination with respect to the axial direction line AL. Further, points Y1 and Y2 are points at which the opening center lines OL (first opening center line OL1 and second opening center line OL2) of each of the cooling hole rows 96, 97, 98, and 99 intersect with the axial direction line AL on the leading edge 42 side of the vane body 40 opposite to in the circumferential direction the negative pressure surface side end portion 66 in the extending direction. The points Y1 and Y2 are disposed closer to the trailing edge 43 side than points Y3 and Y4 at which the opening center lines OL (the first opening center line OL1 and the second opening center line OL2) of each of the cooling hole rows 90a (91, 92, 93, 94) of the modification example intersect with the axial direction line AL. It should be noted that the point Y3 coincides with the leading edge 42.

The positions, at which the opening center lines OL of each of the cooling hole rows 91, 92, 93, and 94 of the first embodiment intersects with the axial direction line AL, coincides with the points Y3 and Y4. The points Y3 and Y4 are positions at which the opening center lines OL (the first opening center line OL1 and the second opening center line OL2) of each of the cooling hole rows 90a (91, 92, 93, 94) of the modification example intersect with the axial direction line AL. Therefore, the points Y1 and Y2 are positions at which the opening center lines OL (first opening center line OL1 and second opening center line OL2) of the cooling holes 89 of the cooling hole rows 96, 97, 98, and 99 of the present embodiment intersect with the axial direction line AL. The points Y1 and Y2 are disposed closer to the trailing edge 43 side than a position at which the opening center lines OL of the cooling hole row 90 of the first embodiment intersect with each other. In addition, the point Y3 is a position at which the first opening center line OL1 of the cooling hole row 90 of the first embodiment intersects with the axial direction line AL. The point Y3 coincides with the position of the leading edge 42. Therefore, the point Y1 is a position at which the first opening center line OL1 of the cooling hole row 95 of the present embodiment intersects with the axial direction line AL. The point Y1 is disposed closer to the trailing edge 43 side than the position of the leading edge 42.

At the point Y1, the first opening center line OL1 of at least two cooling hole rows in the first opening center line OL1 of the cooling hole row 95 of the present embodiment intersects with the axial direction line AL. The point Y1 is disposed in a downstream side leading edge region 42c (third region) in a vane body leading edge cavity 52 closer to the trailing edge 43 side than the leading edge 42. Accordingly, the first opening center line OL1 of the cooling hole row 95 of the present embodiment is formed as a straight line. The straight line starts from the downstream side leading edge region 42c on the more axially downstream side than the leading edge 42, connects the centers of the outlet openings 89b of the at least adjacent two cooling hole 89 constituting the cooling hole row 95, and extends to the leading edge end portion 64 or the negative pressure surface side end portion 66.

Here, the downstream side leading edge region 42c means a circular region that is disposed on the axial direction line AL and that has the same radius as the leading edge region 42a.

Next, the second opening center line OL2 of the cooling hole row 95 is disposed on the axially upstream side to be parallel to the first opening center line OL1 and to be separated from the first opening center line OL1 by the length of the cooling hole 89. Accordingly, at the point Y2, the second opening center line OL2 of at least two cooling hole rows in the second opening center line OL2 of the cooling hole row 95 intersects with the axial direction line AL. The point Y2 is disposed in the intermediate leading edge region 42d (fourth region) in the vane body leading edge cavity 52, at a position closer to the leading edge 42 side than the position of the point YI at which the first opening center line OL1 intersects with the axial direction line AL. Here, the intermediate leading edge region 42d is a circular region that is disposed on the axial direction line AL and that has the same radius as the leading edge region 42a, and is disposed between the leading edge region 42a and the downstream side leading edge region 42c.

The second opening center line OL2 of at least two cooling hole rows in the cooling hole row 95 is formed as a straight line. The straight line starts from the intermediate leading edge region 42d which has a circular shape formed at a position on the more axially upstream side by the length of the cooling hole 89 than the center position of the downstream side leading edge region 42c. The straight line is parallel to the first opening center line OL1, and connects the centers of the inlet openings 89a of at least two adjacent cooling holes 89 constituting the cooling hole row 95. The straight line extends to the leading edge end portion 64 or the negative pressure surface side end portion 66. It is desirable that the same combination of the cooling holes 89 in a case of selecting the first opening center line OL1 is used as the at least two adjacent cooling holes 89 forming the second opening center line OL2.

In addition, the positions of the points Y1 and Y2 are the central positions at which the downstream side leading edge region 42c and the intermediate leading edge region 42d are disposed. The positions are changed by the angle α of the inclination of the cooling hole center line FL in a case where the disposition of the cooling hole rows 90a of the modification example of the first embodiment is changed to that of the cooling hole row 95 of the present embodiment.

According to the cooling structure of the cooling hole row 95 of the present embodiment described above, a group is formed of the plurality of cooling holes 89 at a position closer to the vane surface 41 as compared with the cooling structure of the cooling hole row 90 of the first embodiment. The group is disposed, so that occurrence of thermal damage and thermal stress on the gas path surface 71 of the shroud 60 is suppressed and the gas path surface 71 is appropriately cooled. Further, the amount of cooling air is reduced, and the efficiency of the gas turbine is also improved.

Third Embodiment

The procedure of the cooling method of the turbine stator vanes 24 described in the first embodiment and the second embodiment described above will be described with reference to FIG. 9.

Figure 9:
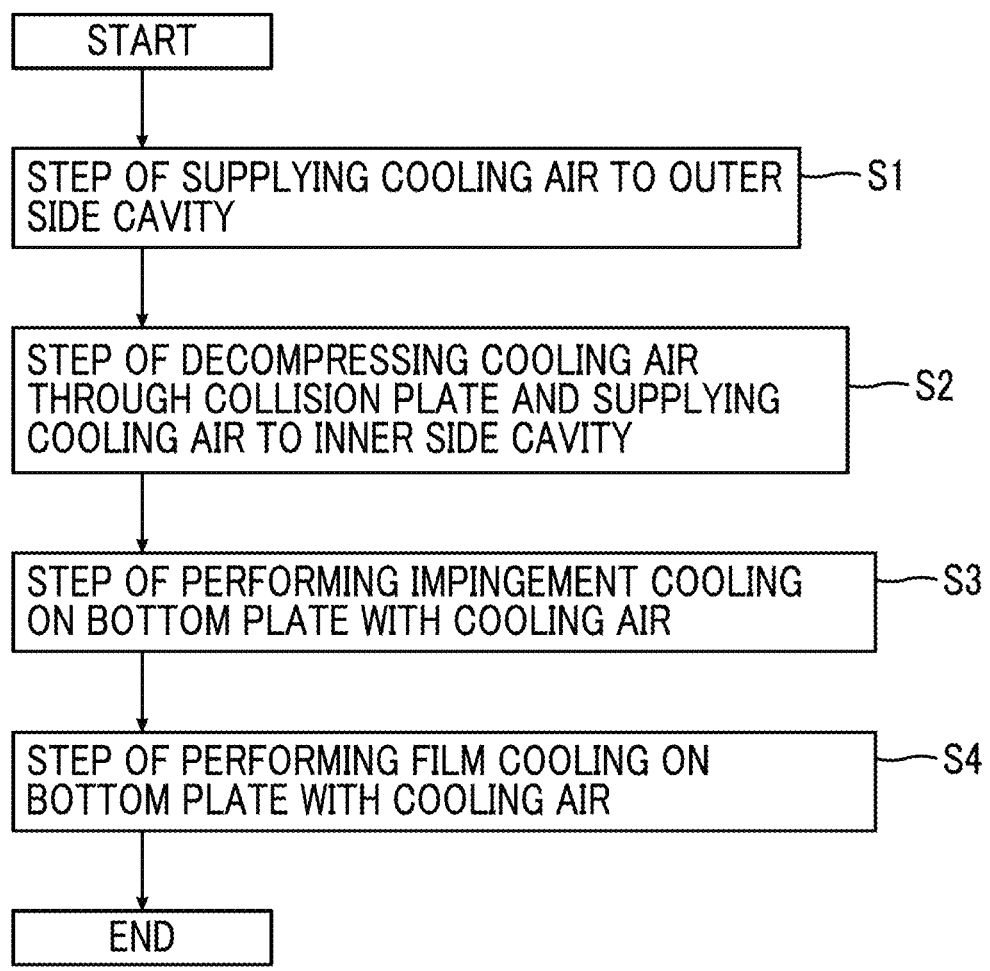
FIG. 9 is a flowchart showing a cooling method of the turbine stator vane.

As shown in FIG. 9, a cooling method of cooling the negative pressure surface side leading edge cavity 81 of the vane body 40 of the turbine stator vane 24 includes: a step S1 of supplying the cooling air Ac to the outer side cavity 82 of the shroud 60; a step S2 of decompressing the cooling air Ac through the through-holes 86 of the collision plate 85 and supplying the cooling air Ac to the inner side cavity 83; a step S3 of performing impingement cooling on the bottom plate 69 with the cooling air; and a steps S4 of performing film cooling on the gas path surface 71 of the bottom plate 69 with the cooling air.

In step S1 of supplying the cooling air Ac to the outer side cavity 82 of the negative pressure surface side leading edge cavity 81 of the shroud 60, the cooling air Ac is supplied to the shroud 60 from the casing 20 or the turbine casing 22 outside the turbine stator vane 24 (S1).

In step S2 of decompressing the cooling air Ac through the through-holes 86 of the collision plate 85, the pressure of the inner side cavity 83 is reduced in a process of discharging the cooling air Ac to the inner side cavity 83 through the plurality of through-holes 86 formed in the collision plate 85 (S2).

In step S3 of performing the impingement cooling on the bottom plate 69 with the cooling air Ac, the cooling air Ac ejected to the inner side cavity 83 through the plurality of through-holes 86 of the collision plate 85 collides with the inner surface 70 of the bottom plate 69, thereby performing the impingement cooling (collision cooling) on the inner surface 70 (S3).

In step S4 of performing the film cooling on the bottom plate 69 with the cooling air Ac, the cooling air Ac after impingement cooling of the inner surface 70 of the bottom plate 69 is supplied to the plurality of cooling holes 89 formed in the bottom plate 69, thereby performing the film cooling on the gas path surface 71 of the bottom plate 69 of the shroud 60 in a process of discharging the cooling air Ac from the outlet openings 89b of the cooling holes 89 to the combustion gas passage 47 (S4). As described above, the first opening center lines OL1 of the cooling hole rows 90 and 95 of the plurality of cooling holes 89 are disposed in parallel along the equal pressure line IBL of the combustion gas G. Accordingly, the differential pressure (pressure difference) is approximately the same between the inner side cavity 83, to which the upstream side of each group of the plurality of cooling holes 89 constituting the cooling hole rows 90 and 95 is connected through the inlet opening 89a, and the combustion gas passage 47, which is connected through the outlet opening 89b on the downstream side. As a result, the amounts of cooling air discharged from each group of the plurality of cooling holes 89 constituting the cooling hole rows 90 and 95 are made uniform to the same flow rate.

According to the cooling method of the turbine stator vane 24 of the present embodiment, the first opening center lines OL1 of the cooling hole rows 90 and 95 of the plurality of cooling holes 89 formed in the bottom plate 69 are disposed in parallel along the equal pressure line IBL of the combustion gas G. As a result, fluctuation in internal pressure of the inner side cavity 83 are stabilized. Further, the first opening center lines OL1 of the cooling hole rows 90 and 95 of the plurality of cooling holes 89 are disposed in parallel along the equal pressure line IBL of the combustion gas G. Therefore, the disposition of the cooling holes 89 is selected such that the differential pressure (pressure difference) between the inner side cavity 83, to which the upstream side of the plurality of cooling holes 89 of the cooling hole rows 90 and 95 is connected, and the combustion gas passage 47, to which the downstream side thereof is connected, is approximately the same. As a result, the amounts of cooling air discharged from the plurality of cooling holes 89 of the cooling hole rows 90 and 95 are made constant and uniform. Accordingly, the excessive discharge of the amounts of cooling air from the cooling holes 89 is suppressed, and the amounts of cooling air can be reduced. Further, the amounts of cooling air discharged from the cooling holes 89 of the cooling hole rows 90 and 95 are made uniform such that the distribution of the metal temperature of the bottom plate 69 is made uniform. As a result, occurrence of thermal stress in the bottom plate 69 of the shroud 60 is suppressed.

Dimensions, materials, shapes, relative dispositions, and the like of components described as the above-mentioned embodiments or illustrated in the drawings are not intended to limit the scope of the invention, but are merely explanatory examples. For example, an expression representing a relative or absolute disposition such as "in a certain direction", "along a certain direction", "parallel", "orthogonal", "center", "concentric", or "coaxial" does not strictly represent only such disposition, but also a tolerance or a state of being relatively displaced with an angle or a distance to the extent that the same function can be obtained. For example, expressions such as "identical", "equal", and "homogeneous" indicating that things are in an equal state do not strictly represent only the equal state, but also a tolerance or a state where there is a difference to the extent that the same function can be obtained.

For example, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained. Meanwhile, the expressions "provided with", "comprising", "including", or "having" one constituent element are not exclusive expressions excluding the presence of other constituent elements.

The contents described in each of the embodiments described above are understood as follows.

(1) According to a first aspect, there is provided a turbine stator vane including: a vane body; a shroud that is formed at an end portion of the vane body in a vane height direction; and a fillet portion that joins the vane body and the shroud. The shroud includes a bottom plate which is in contact with a combustion gas passage, a peripheral wall which extends in the vane height direction along a peripheral edge of the bottom plate, and a recessed portion which forms a space surrounded by the peripheral wall and the bottom plate, the peripheral wall includes a leading edge end portion which extends to a leading edge side of the vane body, and a negative pressure surface side end portion which extends from a leading edge of the vane body on a negative pressure surface side to a trailing edge of the vane body, the shroud has a plurality of cooling holes which are formed in a negative pressure surface side leading edge region of the shroud and formed in the bottom plate, the plurality of cooling holes each have a first end which is connected to an inlet opening formed in the bottom plate, and a second end which is connected to an outlet opening formed in a gas path surface of the bottom plate and formed on a more axially downstream side than the inlet opening, the plurality of cooling holes are disposed at predetermined distances from a vane surface of the vane body toward the leading edge end portion or the negative pressure surface side end portion in a circumferential direction, an inclination of a cooling hole center line connecting the inlet opening and the outlet opening with respect to an axial direction is kept the same, the plurality of cooling holes form a group of cooling hole rows in which a first opening center line having a shape of a straight line connecting centers of the outlet openings and a second opening center line having a shape of a straight line connecting centers of the inlet openings are formed parallel to each other, a plurality of the cooling hole rows are disposed along the vane surface from an axially upstream side toward the axially downstream side, and the inclination of the cooling hole center line of the cooling holes of the plurality of cooling hole rows is smaller toward the axially downstream side.

According to the turbine stator vane described above in (1), the plurality of cooling hole rows are disposed along the vane surface in the negative pressure surface side leading edge region of the shroud, and the inclination of the cooling hole center line of the plurality of cooling hole rows with respect to the axial direction is smaller toward the axially downstream side. On the other hand, the combustion gas flowing on the gas path surface flows to the axially downstream side along the vane surface, and the inclination of the equal pressure line of the combustion gas with respect to the axial direction is smaller toward the axially downstream side along the vane surface.

Accordingly, the inclination of the equal pressure line with respect to the axial direction is smaller, and the inclination of the cooling hole center line of the cooling hole rows also is smaller toward the axially downstream side along the vane surface. As a result, each cooling hole row is formed parallel to the equal pressure line of the combustion gas. Accordingly, the amounts of cooling air discharged from the cooling holes of each cooling hole row are made uniform, the gas path surface is appropriately cooled, and the amounts of cooling air are also reduced.

Further, the flow of the cooling air, which is discharged from the cooling hole, is also discharged along the flow direction of the combustion gas, and does not disturb the combustion gas flow. Accordingly, the effect on the aerodynamic performance of the gas turbine is suppressed.

(2) In the turbine stator vane according to a second aspect, the shroud has a first region which is formed in a circular shape inscribed in an outer edge of the fillet portion around the leading edge of the vane body as a center thereof, and the first opening center line extends from the first region as a starting point thereof.

According to the turbine stator vane described above in (2), the first opening center line of the plurality of cooling holes constituting the cooling hole row extends from the first region as a starting point thereof. Therefore, the first opening center line is formed approximately parallel to the equal pressure line of the combustion gas, and the amount of cooling air discharged from the cooling hole row is made uniform.

(3) In the turbine stator vane according to a third aspect, the shroud has a third region which is disposed in a first cavity formed inside the vane body, which is disposed on the more axially downstream side than the leading edge of the vane body on an axial direction line, and which has a size corresponding to a region formed in a circular shape inscribed in an outer edge of the fillet portion around the leading edge of the vane body as a center thereof, and the first opening center line of at least two cooling hole rows among the cooling hole rows extends from the third region as a starting point thereof.

According to the turbine stator vane described above in (3), in order to avoid interference with the vane body in a case of processing a hole in the cooling hole, a cooling structure is formed of disposition of the cooling holes in which the inclinations of the cooling holes are close to the inclination of the vane surface. In the cooling structure, the first opening center line of at least two cooling hole rows extends from the third region as a starting point thereof. Therefore, each first opening center line of the cooling hole rows is formed approximately parallel to the equal pressure line of the combustion gas. As a result, the amount of cooling air discharged from the cooling hole row is made uniform. Further, it is easy to process the cooling holes.

(4) In the turbine stator vane according to a fourth aspect, the shroud has a second region which is formed in a circular shape having the same radius as the first region on an axial direction line on a more axially upstream side than the leading edge of the vane body, and the second opening center line extends from the second region as a starting point thereof.

According to the turbine stator vane described above in (4), the second opening center line of the plurality of cooling holes constituting the cooling hole row is formed on the axially upstream side in parallel with the first opening center line, and the second opening center line extends from the second region as a starting point thereof. Therefore, the second opening center line is also formed approximately parallel to the equal pressure line of the combustion gas. As a result, the amount of cooling air discharged from the cooling hole row is made uniform.

(5) In the turbine stator vane according to a fifth aspect, the shroud has a fourth region which is disposed in the first cavity, which is disposed on the more axially downstream side than the leading edge of the vane body on the axial direction line and on a more axially upstream side than the third region, and which is formed in a circular shape having the same radius as the third region, and the second opening center line of at least two cooling hole rows among the cooling hole rows extends from the fourth region as a starting point thereof.

According to the turbine stator vane described above in (5), the second opening center line of the plurality of cooling holes constituting the cooling hole row is formed on the axially upstream side in parallel with the first opening center line, and the second opening center line extends from the fourth region as a starting point thereof. Therefore, the second opening center line is also formed approximately parallel to the equal pressure line of the combustion gas. As a result, the amount of cooling air discharged from the cooling hole row is made uniform.

(6) In the turbine stator vane according to a sixth aspect, the first opening center line or the second opening center line is formed by at least two cooling holes adjacent to each other in a direction in which the first opening center line or the second opening center line extends.

According to the turbine stator vane described above in (6), the first opening center line or the second opening center line of the cooling hole row is formed by the at least two adjacent cooling holes in a direction in which the first opening center line or the second opening center line extends. As a result, it is easy to process the cooling holes.

(7) In the turbine stator vane according to a seventh aspect, the cooling hole center line is inclined toward a side of the vane surface from a direction orthogonal to the first opening center line or the second opening center line.

According to the turbine stator vane described above in (7), the cooling hole center line of the cooling hole is inclined toward the vane surface side from the direction orthogonal to the first opening center line or the second opening center line. Therefore, the cooling air discharged from the cooling holes does not disturb the flow of the combustion gas flowing on the gas path surface.

(8) In the turbine stator vane according to the eighth aspect, the inclination of the cooling hole center line of the cooling hole row with respect to the first opening center line is kept the same even for the cooling hole row at any position in the axial direction.

According to the turbine stator vane described above in (8), the inclination of the cooling hole center line of the cooling hole row with respect to the first opening center line is kept the same even for the cooling hole row at any position in the axial direction. Therefore, the cooling air discharged from the cooling hole does not disturb the flow of the combustion gas flowing on the gas path surface.

(9) In the turbine stator vane according to a ninth aspect, a distance in the axial direction between the first opening center line of the plurality of cooling hole rows and the first opening center line of the cooling hole rows, which are disposed adjacent to each other in the axial direction, is larger toward the axially downstream side.

According to the turbine stator vane described above in (9), the distance between the equal pressure lines of the combustion gas in the second cavity is larger toward the axially downstream side. On the other hand, the first opening center line of the cooling hole rows is disposed parallel to the equal pressure line of the combustion gas. Accordingly, the distance between the first opening center lines of the cooling hole rows also is larger toward the axially downstream side, and the gas path surface to which the cooling air is discharged is uniformly cooled.

(10) In the turbine stator vane according to a tenth aspect, the plurality of cooling holes of the cooling hole rows are disposed with distances kept the same in a direction in which the first opening center line or the second opening center line extends.

According to the turbine stator vane described above in (10), the cooling holes constituting the cooling hole row are disposed with distances kept the same in the direction in which the first opening center line or the second opening center line extends. Therefore, the gas path surface to which the cooling air is discharged is uniformly cooled.

(11) In the turbine stator vane according to an eleventh aspect, a group of the plurality of cooling holes constituting the plurality of cooling hole rows radially expands from at least one region as a starting point among the first to fourth regions toward the leading edge end portion or the negative pressure surface side end portion.

According to the turbine stator vane described above in (11), the group of the plurality of cooling holes constituting the plurality of cooling hole rows radially extends from at least one region as a starting point among the first to fourth regions toward the leading edge end portion or the negative pressure surface side end portion. As a result, the group of cooling holes constituting the cooling hole row radially expands with the inclination of the vane surface. Therefore, the gas path surface is uniformly cooled and the flow of the discharged cooling air does not disturb the flow of the combustion gas flow.

(12) In the turbine stator vane according to a twelfth aspect, either of the first opening center line or the second opening center line of the plurality of cooling hole rows radially expands from at least one region as a starting point among the first to fourth regions toward the leading edge end portion or the negative pressure surface side end portion.

According to the turbine stator vane described above in (12), either of the first opening center line or the second opening center line of the plurality of cooling hole rows radially expands from the at least one region as a starting point among the first to fourth regions toward the leading edge end portion or the negative pressure surface side end portion. As a result, the first opening center line or the second opening center line of the cooling hole row radially expands with the inclination of the vane surface. Therefore, the gas path surface is uniformly cooled and the flow of the discharged cooling air does not disturb the flow of the combustion gas flow.

(13) In the turbine stator vane according to a thirteenth aspect, in the shroud, the recessed portion is partitioned by a leading edge partition rib connecting the vane body and the leading edge end portion and a negative pressure surface side partition rib connecting the vane body and the negative pressure surface side end portion, the shroud includes a second cavity formed to be surrounded by an outer wall surface of the vane body, the leading edge partition rib, and the negative pressure surface side partition rib, in the shroud, the second cavity is partitioned into a third cavity formed on an outer side in the vane height direction and a fourth cavity formed on an inner side of the third cavity, and a collision plate having a plurality of through-holes that allow the third cavity and the fourth cavity to communicate with each other.

According to the turbine stator vane described above in (13), in the shroud, the recessed portion is partitioned by the leading edge partition rib connecting the vane body and the leading edge end portion and the negative pressure surface side partition rib connecting the vane body and the negative pressure surface side end portion. The shroud includes the second cavity formed of the outer wall surface of the vane body, the leading edge partition rib, and the negative pressure surface side partition rib. Further, in the shroud, the second cavity is partitioned into a third cavity formed on an outer side in the vane height direction and a fourth cavity formed on an inner side of the third cavity. The shroud includes a collision plate having a plurality of through-holes that allow the third cavity and the fourth cavity to communicate with each other. As a result, the bottom plate is effectively cooled by the combination of the impingement cooling of the inner surface of the bottom plate and the film cooling of the gas path surface by the cooling holes of the bottom plate with the cooling air supplied to the inner side shroud through the collision plate.

(14) In a turbine stator vane according to a fourteenth aspect, the shroud includes an outer side shroud which is formed at an outer end portion of the vane body in the vane height direction, and an inner side shroud which is formed at an inner end portion of the vane body in the vane height direction.

(15) According to a fifteenth aspect, there is provided a gas turbine including: the turbine stator vane according to any one of claims 1 to 13; and a combustor that generates a combustion gas flowing through a combustion gas passage provided with the turbine stator vane.

In the gas turbine described above in (15), the thermal stress of the turbine stator vane is reduced, and the reliability is improved. Further, the amount of cooling air is reduced, and the efficiency of the gas turbine is improved.

(16) According to a sixteenth aspect, there is a cooling method of a turbine stator vane including a vane body and a shroud that is formed at an end portion of the vane body in a vane height direction. The shroud includes a bottom plate which is in contact with a combustion gas passage, a peripheral wall which extends in the vane height direction along a peripheral edge of the bottom plate, a recessed portion which forms a space surrounded by the peripheral wall and the bottom plate, a second cavity which is formed in a negative pressure surface side leading edge region by partitioning the recessed portion by the bottom plate and a plurality of partition ribs connecting the vane body and the peripheral wall, and a collision plate which partitions the second cavity into a third cavity, which is formed on an outer side in the vane height direction, and a fourth cavity, which is formed on an inner side of the third cavity, and which has a a plurality of through-holes that allow the third cavity and the fourth cavity to communicate with each other, the turbine stator vane further includes a cooling hole row that has a plurality of cooling holes communicating with the fourth cavity through inlet openings formed in an n inner surface of the bottom plate and communicating with the combustion gas passage through outlet openings formed in a gas path surface of the bottom plate. The cooling method includes: a step of supplying cooling air to the third cavity from outside; a step of reducing a pressure of the cooling air of the fourth cavity by supplying the cooling air from the third cavity to the fourth cavity through the through-hole formed in the collision plate disposed in the negative pressure surface leading edge cavity; a step of performing impingement cooling on the inner surface of the bottom plate with the cooling air; and a step of performing film cooling on the gas path surface by discharging the cooling air into the combustion gas passage from the plurality of cooling holes which constitute the cooling hole row formed in the bottom plate and having a first opening center line disposed parallel to an equal pressure line of a combustion gas.

According to the cooling method of a turbine stator vane described above in (16), the shroud includes the second cavity having the collision plate in a region on the negative pressure surface side of the shroud. The cooling air supplied from the outside is decompressed through the through-holes of the collision plate. Thereby, the impingement cooling is performed on the inner surface of the bottom plate. Further, the first opening center line connecting the outlet openings of the cooling holes forming the cooling hole row is disposed parallel to the equal pressure line of the combustion gas flow. Therefore, the pressures at the outlet openings of the cooling holes constituting the cooling hole row are kept the same, and fluctuation in internal pressure of the fourth cavity connected to the upstream side of the cooling hole is suppressed. Accordingly, the amount of cooling air discharged from the cooling holes is stabilized, the gas path surface is appropriately cooled, and the amount of cooling air is reduced.

REFERENCE SIGNS LIST

1: gas turbine
2: compressor
4: combustor
6: turbine
8: rotor
10: compressor casing
12: intake chamber
14: inlet guide vane
16: compressor stator vane
18: compressor rotor vane
20: casing
22: turbine casing
24: turbine stator vane
26: turbine rotor vane
28: exhaust casing
29: exhaust chamber
40: vane body
40a: vane body end portion
40b: vane wall
41: vane surface
42: leading edge
42a: leading edge region (first region)
42b: upstream side leading edge region (second region)
42c: downstream side leading edge region (third region)
42d: intermediate leading edge region (fourth region)
43: trailing edge
44: negative pressure surface
45: positive pressure surface
46: fillet portion
46a: outer edge
47: combustion gas passage
49: vane body partition rib
51: vane body cavity (first cavity)
52: vane body leading edge cavity
53: vane body intermediate cavity
54: vane body trailing edge cavity
56: lid
56a: opening
60: shroud (outer side shroud 60a, inner side shroud 60b)
62: peripheral wall
62a: inner wall
64: leading edge end portion
65 trailing edge end portion
66: negative pressure surface side end portion
67: positive pressure surface side end portion
69: bottom plate
70: inner surface
71: outer surface (gas path surface)
73: partition rib
73a: leading edge partition rib
73b: negative pressure surface side intermediate partition rib
75: recessed portion
76: hook
80: cavity
81: negative pressure surface side leading edge cavity (second cavity)
82: outer side cavity (third cavity)
83: inner side cavity (fourth cavity)
85: collision plate
86: through-hole
89: cooling hole
89a: inlet opening
89b: outlet opening
90: cooling hole row (first cooling hole row 91 (91a to 91e), second cooling hole row 92 (92a to 92e), third cooling hole row 93 (93a to 93c), fourth cooling hole row 94 (94a to 94c))

90a: cooling hole row (modification example)
95: cooling hole row (first cooling hole row 96 (96a to 96e), second cooling hole row 97 (97a to 97e), third cooling hole row 98 (98a to 98c), fourth cooling hole row 99 (99a to 99c))
G: combustion gas
Ac: cooling air
AL: axial direction line
FL: cooling hole center line
OL: opening center line
OL1: first opening center line
OL2: second opening center line
IBL, IBL1, IBL2, IBL3: equal pressure line
Xa: starting point
Xb: intermediate point

The invention claimed is:

1. A turbine stator vane comprising:
a vane body;
a shroud that is formed at an end portion of the vane body in a vane height direction; and
a fillet portion that joins the vane body and the shroud, wherein the shroud includes
a bottom plate which is in contact with a combustion gas passage,
a peripheral wall which extends in the vane height direction along a peripheral edge of the bottom plate, and
a recessed portion which forms a space surrounded by the peripheral wall and the bottom plate,
the peripheral wall includes
a leading edge end portion which extends to a leading edge side of the vane body, and
a negative pressure surface side end portion which extends from a leading edge of the vane body on a negative pressure surface side to a trailing edge of the vane body,
the shroud has a plurality of cooling holes which are formed in a negative pressure surface side leading edge region of the shroud and formed in the bottom plate,
the plurality of cooling holes each have
a first end which is connected to an inlet opening formed in the bottom plate, and
a second end which is connected to an outlet opening formed in a gas path surface of the bottom plate and formed on a more axially downstream side than the inlet opening,
the plurality of cooling holes are disposed at predetermined distances from a vane surface of the vane body toward the leading edge end portion or the negative pressure surface side end portion in a circumferential direction,
an inclination of a cooling hole center line connecting the inlet opening and the outlet opening with respect to an axial direction is kept the same,
the plurality of cooling holes constitute a group of cooling hole rows in which a first opening center line having a shape of a straight line connecting centers of the outlet openings and a second opening center line having a shape of a straight line connecting centers of the inlet openings are formed parallel to each other,
a plurality of the cooling hole rows are disposed along the vane surface from an axially upstream side toward the axially downstream side, and
the inclination of the cooling hole center line of the cooling holes of the plurality of cooling hole rows is smaller toward the axially downstream side.

2. The turbine stator vane according to claim 1,
wherein the shroud has a first region which is formed in a circular shape inscribed in an outer edge of the fillet portion around the leading edge of the vane body as a center thereof, and
the first opening center line extends from the first region as a starting point thereof.

3. The turbine stator vane according to claim 2,
wherein the shroud has a second region which is formed in a circular shape having the same radius as the first region on an axial direction line on a more axially upstream side than the leading edge of the vane body, and
the second opening center line extends from the second region as a starting point thereof.

4. The turbine stator vane according to claim 1,
wherein the shroud has a third region which is disposed in a first cavity formed inside the vane body, which is disposed on the more axially downstream side than the leading edge of the vane body on an axial direction line, and which has a size corresponding to a region formed in a circular shape inscribed in an outer edge of the fillet portion around the leading edge of the vane body as a center thereof, and
the first opening center line of at least two cooling hole rows among the cooling hole rows extends from the third region as a starting point thereof.

5. The turbine stator vane according to claim 4,
wherein the shroud has a fourth region which is disposed in the first cavity, which is disposed on the more axially downstream side than the leading edge of the vane body on the axial direction line and on a more axially upstream side than the third region, and which is formed in a circular shape having the same radius as the third region, and
the second opening center line of at least two cooling hole rows among the cooling hole rows extends from the fourth region as a starting point thereof.

6. The turbine stator vane according to claim 1,
wherein the first opening center line or the second opening center line is formed by at least two cooling holes adjacent to each other in a direction in which the first opening center line or the second opening center line extends.

7. The turbine stator vane according to claim 6,
wherein a group of the plurality of cooling holes constituting the plurality of cooling hole rows radially extends from at least one region as a starting point among the first to fourth regions toward the leading edge end portion or the negative pressure surface side end portion.

8. The turbine stator vane according to claim 6,
wherein either of the first opening center line or the second opening center line of the plurality of cooling hole rows radially extends from at least one region as a starting point among the first to fourth regions toward the leading edge end portion or the negative pressure surface side end portion.

9. The turbine stator vane according to claim 1,
wherein the cooling hole center line is inclined toward a side of the vane surface from a direction orthogonal to the first opening center line or the second opening center line.

10. The turbine stator vane according to claim 1,
wherein the inclination of the cooling hole center line of the cooling hole row with respect to the first opening center line is kept the same even for the cooling hole row at any position in the axial direction.

11. The turbine stator vane according to claim 1,
wherein a distance in the axial direction between the first opening center line of the plurality of cooling hole rows and the first opening center line of the cooling hole rows, which are disposed adjacent to each other in the axial direction, is larger toward the axially downstream side.

12. The turbine stator vane according to claim 1,
wherein the plurality of cooling holes of the cooling hole rows are disposed with distances kept the same in a direction in which the first opening center line or the second opening center line extends.

13. The turbine stator vane according to claim 1,
wherein in the shroud, the recessed portion is partitioned by a leading edge partition rib connecting the vane body and the leading edge end portion and a negative pressure surface side partition rib connecting the vane body and the negative pressure surface side end portion,
the shroud includes a second cavity formed to be surrounded by an outer wall surface of the vane body, the leading edge partition rib, and the negative pressure surface side partition rib,
in the shroud, the second cavity is partitioned into a third cavity formed on an outer side in the vane height direction and a fourth cavity formed on an inner side of the third cavity, and
a collision plate having a plurality of through-holes that allow the third cavity and the fourth cavity to communicate with each other.

14. The turbine stator vane according to claim 1,
wherein the shroud includes an outer side shroud which is formed at an outer end portion of the vane body in the vane height direction, and an inner side shroud which is formed at an inner end portion of the vane body in the vane height direction.

15. A gas turbine comprising:
the turbine stator vane according to claim 1; and
a combustor that generates a combustion gas flowing through a combustion gas passage provided with the turbine stator vane.

16. A cooling method of a turbine stator vane including a vane body and a shroud that is formed at an end portion of the vane body in a vane height direction,
wherein the shroud includes
a bottom plate which is in contact with a combustion gas passage,
a peripheral wall which extends in the vane height direction along a peripheral edge of the bottom plate,
a recessed portion which forms a space surrounded by the peripheral wall and the bottom plate,
a second cavity which is formed in a negative pressure surface side leading edge region by partitioning the recessed portion by the bottom plate and a plurality of partition ribs connecting the vane body and the peripheral wall, and
a collision plate which partitions the second cavity into a third cavity, which is formed on an outer side in the vane height direction, and a fourth cavity, which is formed on an inner side of the third cavity, and which has a plurality of through-holes that allow the third cavity and the fourth cavity to communicate with each other,
the turbine stator vane further includes a cooling hole row that has a plurality of cooling holes communicating with the fourth cavity through inlet openings formed in an inner surface of the bottom plate and communicating with the combustion gas passage through outlet openings formed in a gas path surface of the bottom plate, and
the cooling method comprises:
a step of supplying cooling air to the third cavity from outside;
a step of reducing a pressure of the cooling air of the fourth cavity by supplying the cooling air from the third cavity to the fourth cavity through the through-hole formed in the collision plate disposed in the negative pressure surface leading edge cavity;
a step of performing impingement cooling on the inner surface of the bottom plate with the cooling air; and
a step of performing film cooling on the gas path surface by discharging the cooling air into the combustion gas passage from the plurality of cooling holes which constitute the cooling hole row formed in the bottom plate and having a first opening center line disposed parallel to an equal pressure line of a combustion gas.

* * * * *